(12) United States Patent
Takamori et al.

(10) Patent No.: US 7,651,832 B2
(45) Date of Patent: *Jan. 26, 2010

(54) OPTICAL INFORMATION RECORDING MEDIUM, RECORDING/REPRODUCING METHOD, AND RECORDING/REPRODUCING DEVICE

(75) Inventors: Nobuyuki Takamori, Kitakatsuragi-gun (JP); Go Mori, Nara (JP); Hideharu Tajima, Ikoma-gun (JP); Masaki Yamamoto, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 952 days.

This patent is subject to a terminal disclaimer.

(21) Appl. No.: 11/083,463

(22) Filed: Mar. 17, 2005

(65) Prior Publication Data

US 2005/0213479 A1  Sep. 29, 2005

(30) Foreign Application Priority Data

Mar. 18, 2004 (JP) ............................. 2004-079219
Mar. 16, 2005 (JP) ............................. 2005-075827

(51) Int. Cl.
G11B 7/24 (2006.01)
(52) U.S. Cl. .................. 430/270.14; 430/945; 369/283; 428/64.4
(58) Field of Classification Search ........................ None
See application file for complete search history.

(56) References Cited

U.S. PATENT DOCUMENTS 3,914,023 A * 10/1975 Thelen ........................ 359/588

(Continued)

FOREIGN PATENT DOCUMENTS

JP  59-037505  *  3/1984

(Continued)

OTHER PUBLICATIONS

Shintani et al., "A New Super-Resolution Film Applicable to Read-Only and Rewritable Optical Disks," Japan J. Appl. Phys. 38:1656-1660 (1999).

(Continued)

Primary Examiner—Martin J Angebranndt
(74) Attorney, Agent, or Firm—Edwards Angell Palmer & Dodge LLP; David G. Conlin; David A. Tucker

(57) ABSTRACT

The subject invention achieves further improvement in recording density for an optical information recording medium using a medium super-resolution effect with a super-resolution film, by reduction of the effective spot diameter in a further effective way. According to the optical information recording medium of the present invention, information is recorded on a recording surface of a substrate 5 in the form of phase pits. On the recording surface, an information layer 4, composed of a reflection film 6, a light-absorbing film 3 and a temperature-responsive film 2, is formed. The temperature-responsive film 2 is made of a ZnO film, which is an inorganic super-resolution film whose complex refractive index changes according to intensity of incident light, the film is also superior in a light transmittance property. The light-absorbing film 3 is made of an Si film 3, which absorbs a part of the incident light so that the temperature of the information layer 4 increases. The reflection film 6 is made of an Al film.

23 Claims, 15 Drawing Sheets

U.S. PATENT DOCUMENTS

| | | | |
|---|---|---|---|
| 6,221,557 B1 * | 4/2001 | Harigaya et al. | 430/270.13 |
| 6,524,766 B1 | 2/2003 | Ariyoshi et al. | |
| 6,790,502 B1 | 9/2004 | Yamamoto et al. | |
| 6,965,556 B1 * | 11/2005 | Kikukawa et al. | 369/284 |
| 7,313,080 B2 * | 12/2007 | Shiono et al. | 369/275.1 |
| 7,397,755 B2 * | 7/2008 | Takamori et al. | 369/275.1 |
| 7,436,755 B2 * | 10/2008 | Takamori et al. | 369/275.1 |
| 7,556,912 B2 * | 7/2009 | Mori et al. | 430/270.13 |
| 2001/0015949 A1 | 8/2001 | Nagase et al. | |
| 2003/0035360 A1 | 2/2003 | Shinotsuka et al. | |
| 2003/0174610 A1 * | 9/2003 | Miyamoto et al. | 369/47.46 |
| 2003/0218969 A1 * | 11/2003 | Tsai et al. | 369/288 |
| 2004/0004932 A1 * | 1/2004 | Inoue et al. | 369/283 |
| 2004/0027982 A1 * | 2/2004 | Hirotsune et al. | 369/284 |
| 2004/0038080 A1 * | 2/2004 | Inoue et al. | 428/694 SC |
| 2004/0076908 A1 * | 4/2004 | Oomachi et al. | 430/270.13 |
| 2004/0105952 A1 * | 6/2004 | Deguchi et al. | 428/64.4 |
| 2004/0121261 A1 * | 6/2004 | Ashida et al. | 430/270.13 |
| 2004/0151867 A1 * | 8/2004 | Nee | 428/64.1 |
| 2004/0202895 A1 * | 10/2004 | Inoue et al. | 428/694 SC |
| 2004/0240374 A1 * | 12/2004 | Tajima et al. | 369/275.4 |
| 2004/0247815 A1 | 12/2004 | Takamori et al. | |
| 2005/0007937 A1 * | 1/2005 | Mori et al. | 369/275.2 |
| 2005/0117505 A1 | 6/2005 | Takamori et al. | |
| 2005/0213487 A1 * | 9/2005 | Yamamoto et al. | 369/288 |

FOREIGN PATENT DOCUMENTS

| | | | |
|---|---|---|---|
| JP | 61-296306 | * | 12/1986 |
| JP | 62-192948 | * | 8/1987 |
| JP | 63-247091 | * | 10/1988 |
| JP | 63-306550 | * | 12/1988 |
| JP | 01-037503 | * | 2/1989 |
| JP | 05-313013 | * | 11/1993 |
| JP | 08-111035 | | 4/1996 |
| JP | 2000-285509 | * | 10/2000 |
| JP | 2001-084643 | | 3/2001 |
| JP | 2001-084645 | | 3/2001 |
| JP | 2002-056573 | | 2/2002 |
| JP | 2002-237095 | * | 8/2002 |
| JP | 2003-335062 | * | 11/2003 |
| JP | 2004-158145 | * | 6/2004 |
| JP | 2004-355783 A | | 12/2004 |
| JP | 2004-362718 A | | 12/2004 |
| JP | 2005-339795 A | | 12/2005 |
| WO | 03/044788 | * | 5/2003 |
| WO | 03/075268 | * | 9/2003 |

OTHER PUBLICATIONS

Kiyoshi Takahashi et al., "Taiyoukouhatsuden (Photovoltaics)" Published by Morikita Shuppan on Dec. 10, 1980, p. 41.

U.S. Appl. No. 10/862,187, filed Jun. 4, 2004.

* cited by examiner

OPTICAL INFORMATION RECORDING MEDIUM, RECORDING/REPRODUCING METHOD, AND RECORDING/REPRODUCING DEVICE

This Nonprovisional application claims priority under 35 U.S.C. § 119(a) on Patent Application Nos. 2004/79219 and 2005/75827 filed in Japan respectively on Mar. 18, 2004 and on Mar. 16, 2005, the entire contents of which are hereby incorporated by reference.

FIELD OF THE INVENTION

The present invention relates to an optical information recording medium capable of recording and reproduction, or only reproduction of information by light irradiation, particularly to an optical information recording medium using a super-resolution medium technology which enables recording and/or reproduction of recorded marks equal to or less than the optical resolution, which depends on the spot diameter of diffraction limited light, a recording/reproducing method for such an optical information recording medium, and a recording/reproducing device for the optical information recording medium.

BACKGROUND OF THE INVENTION

Because of advanced computerization, and development of information communication and multimedia technologies in recent years, demands for a higher density and a greater capacity of optical information recording medium is increasing. The upper limit of the recording density of optical information recording medium is limited mostly by a spot diameter of an optical beam which records or reproduces information. A light spot diameter is substantially expressed by $\lambda/NA$, where $\lambda$ expresses a wavelength of light source, and NA expresses a numerical aperture of an objective lens. To improve the recording density, the light spot diameter needs to be reduced.

However, because of absorption by optical elements and the limit of sensitivity property of a detecting device, the wavelength $\lambda$ of the light source cannot be reduced less than a wavelength of an ultraviolet range. Moreover, the improvement of NA is substantially limited by the permissible range of the inclination of a medium. On this account, there is a limit in improving the recording density by reducing the light spot diameter.

To overcome the limit, there is a technique called a super-resolution medium technology, which achieves reduction in effective light spot diameter by using the optical characteristics of recording medium. According to the super-resolution medium technology, a part of the light spot is masked by utilizing (a) a temperature distribution on the recording medium and (b) a change in transmittance, which are induced by the light spot, so as to reduce the effective spot for recording/reproducing, thereby increasing a recording/reproducing density. Such an effect is called a medium super-resolution effect.

FIG. 20 schematically illustrates the above-described medium super-resolution effect. A light spot 111 relatively scans the super-resolution medium in a direction indicated by an arrow 113 to carry out recording and reproduction. In general reproduction, all recorded marks 112 positioned in the light spot 111 contribute to reproducing signals. However, in the super-resolution medium, the light spot 111 is masked except for the central region 111a with a high light intensity, so that only the recorded mark 112a in the central region 111a is reproduced. In this way, the diameter of effective light spot for reproducing is practically reduced. On the contrary to the example of FIG. 20, it is also possible to detect the recorded marks 112 in a peripheral region 111b in the light spot 111 by masking the central region 111a.

The followings are conventional methods for carrying out the super-resolution medium technology.

(1) A super-resolution read-out technology using a mask made of an organic dye (2) A super-resolution technology using a photochromic mask film (3) A super-resolution technology using an inorganic oxide film Among these, the method using an organic dye or a photochromic (the methods (1) and (2)) is not sufficiently reliable in information reproduction since a disk including an organic mask layer is easily broken by heat, and is endured readout of approximately 10,000 times or less. For this reason, those methods are not in practical use. In addition, because of the fragility under heat, those methods cannot be employed for rewritable discs.

In contrast, referring to Document 2, a disk according to the super-resolution technology using the inorganic oxide film (the method (3)) allows (repeated) readout of 100,000 times or more, and a phase-change medium applying this super-resolution film is rewritable. This is because, a disk using super-resolution film of an inorganic material is not broken by heat as easily as the disc using the super-resolution film of an organic material, such as the mask using an organic dye or the photochromic mask layer. On this account, the inorganic oxide super-resolution film according to the method (3) is a super-resolution material applicable to both a read-only disc and a rewritable disc.

Further, Document 1 discloses the optical information recording medium which is arranged such that (i) a Co—Si—Na—Ca—O film or a $Co_3O_4$ film is used as the inorganic oxide super-resolution film, and (ii) reflectivity of a multilayer film increases with an increase in intensity of the incident light. This optical information recording medium is made in view of such a defect of an inorganic oxide super-resolution film that a decrease in reflectivity with a change in complex refractive index causes an increase in diameter of an effective reproducing spot, thereby failing to ensure a reproducing signal amplitude property, which contributes to improvement in recording density.

Moreover, according to Document 1, when the inorganic oxide super-resolution film (hereinafter referred to as an inorganic super-resolution film) is irradiated with a laser light greater than a certain threshold value, a complex refractive index thereof changes. When applying the inorganic super-resolution film to an optical disc, the inorganic super-resolution film is provided as a part of a multilayer lamination structure. In this structure, when reproducing information recorded on the optical disc, the complex refractive index of the inorganic super-resolution film changes in the center of the light spot where the temperature has increased, and the complex refractive index of this area changes due to a multiple interference of light in the multilayer film. This enables intensive readout of signals in a part of the light spot, thereby reducing the effective spot diameter for reproducing.

Such a multilayer structure containing an inorganic super-resolution film can be improved in function by increasing the change in complex refractive index of the multilayer structure. In order to increase the change in the reflectivity of the multilayer film, it is effective to adequately use the multiple interference of light in the multilayer film.

However, one of the inorganic super-resolution films used in Document 1 is 50 nm in thickness, with a complex refractive index (=n−ki, where i is an imaginary unit) n=2.48, and an extinction coefficient k=0.48, as default values. These values are respectively changed to: n=2.41 and k=0.57 with an increase in intensity of incident light. However, since the extinction coefficient k is large in this structure, there is a limit in effectively increasing the change in the reflectivity of the multilayer film.

That is, in the arrangement in which the extinction coefficient k is such a large value, light is absorbed as it passes through the inorganic super-resolution film, so that the inorganic super-resolution film functions as a translucent film. When the inorganic super-resolution film functions as a translucent film, the light is absorbed while multiple optical interference repeatedly occurs. Thus, the effect of multiple optical interference is not fully ensured.

To more specifically explain this principle, the following explains light absorption in the above-described inorganic super-resolution film with a thickness=50 nm, and an extinction coefficient k=0.48. For ease of explanation that only deals with absorption, the multiple interference is ignored here. Thus, the intensity of transmitted light which passes through the inorganic super-resolution film is expressed by the following equations:

$$I = I_0 \times \exp(-\alpha x),$$

where $I_0$ expresses the intensity of incident light, I expresses the intensity of transmitted light, x expresses the thickness of the film, and a expresses the absorption coefficient, which is denoted by $\alpha = 4\pi k/\lambda$, where $\lambda$ is the wavelength of the incident light.

According to these equations, the intensity I of the transmitted light exponentially decreases as the thickness x and the extinction coefficient k increase.

In the above example, the wavelength A of the light source is 660 nm, which makes the transmittance (=the intensity of transmitted light/the intensity of incident light) 63% according to the foregoing equation. However, because the density of the optical information recording medium is increasing in recent years, the wavelength of the light source tends to decrease, and an optical information recording medium using a blue laser of wavelength 400 nm is now put to practical use. When the light source with a wavelength=400 nm is used in the above example, the transmittance decreases to 47%.

Note that, in this calculation, the multiple interference is ignored to only deal with the absorption. However, if considering the multiple interference, the transmittance further decrease because respective rays of the light weaken each other.

Therefore, when the above structure uses the optical system which emits light of wavelength 400 nm, the amount of light having passed through the inorganic super-resolution film becomes equal to or less than one half of the incident light. This amount is not enough to utilize the multiple interference. In addition, the light is not efficiently used.

The change in the reflectivity of the multilayer film can also be increased by increasing the thickness of the inorganic super-resolution film so as to enhance the effect of change in refractive index. However, when a translucent inorganic super-resolution film is increased in thickness, light cannot pass through the inorganic super-resolution film. The increase in thickness of the inorganic super-resolution film is therefore not desired.

According to the above equations, the transmittance drastically decreases from 63% to 40% for a light source with a wavelength=660 nm, from 47% to 22% for a light source with a wavelength=400 nm, when the thickness is doubled, that is, when the thickness is increased to 100 nm. As the transmittance thus greatly decreases for a short wavelength, it is insufficient to ensure the effect of multiple interference. In addition, the light is not efficiently used.

Especially, when the inorganic super-resolution layer is translucent, the efficiency in use of light decreases in the information layer including the inorganic super-resolution film. Therefore, there is a difficulty in using such an arrangement for a multi-recording-section structure, that contains lamination of a plurality of recording layers for recording information, or of a plurality of recording surfaces where information are recorded in the form of pits which create depression/projection on the recording surface.

Note that, in order to increase the change in reflectivity without changing the thickness of inorganic super-resolution film, one possible method is increasing the amount of change in the complex refractive index of inorganic super-resolution film; however, since the amount of change in the complex refractive index differs for each substance, it is difficult to expect a significant improvement by this method.

(Documents)

1. Japanese Laid-Open Patent Publication No. 2001/84643 (Tokukai 2001-84643, filed on Mar. 30, 2001), corresponding U.S. Pat. No. 6,524,766
2. Toshimichi Shintani, Motoyasu Terao, Hiroki Yamamoto and Takashi Naito, "Jpn. J. Appl. Phys (Japan Journal of Applied Physics) Vol. 38", 1999, p. 1656 to p. 1660
3. Kiyoshi Takahashi, Yoshihiro Hamakawa and Akio Ushirokawa, "Photovoltaics", second impression of the first edition, MORIKITA SHUPPAN, published on Dec. 10, 1980, p. 41

SUMMARY OF THE INVENTION

The present invention was made to solve the above problems, and an object of the present invention is to effectively reduce the effective spot diameter in an optical information recording medium, a recording/reproducing method and a recording/reproducing device, which obtain the medium super-resolution effect by using a super-resolution film.

In order to solve the above-described problems, the optical information recording medium of the present invention includes at least one information layer for enabling reproduction of information recorded thereon, with irradiation of an optical beam, the information layer comprising: a responsive film whose complex refractive index changes according to the optical beam wherein an extinction coefficient of the complex refractive index is less than 0.2 at room temperature.

Here, the change in complex refractive index of the responsive film may occur (a) directly according to the optical beam, or (b), for example, according to the change in temperature of the information layer, which is increased by the irradiation of optical beam.

According to the above arrangement, when the optical beam is incident on the optical information recording medium, the complex refractive index of the responsive film is changed. Moreover, the state of the optical beam (for example, the intensity of the optical beam) is distributed in the light spot, which is an irradiation area of the optical disc created by the irradiation of the optical beam. Therefore, the distribution of the multiple interference of light occurs in the light spot on the information layer according to the optical beam. On this account the reflectivity in the light spot of the information layer is distributed. As a result, it is possible to intensively read recording bits in a region, smaller than the light spot, in the light spot. In this manner, it becomes possible to successfully reduce the effective reproducing spot, thereby carrying out a super-resolution reproduction.

Moreover, the extinction coefficient of the complex refractive index of the responsive film is less than 0.2 at room temperature, that is, the responsive film is highly transparent. On this account, the light absorption, which occurs while the light of the optical beam repeatedly reflects in the responsive film, is suppressed, so that the light is reflects in the responsive film many times. In this way, the amount of light repeatedly reflected in the responsive film is increased, so that the effect of the multiple interference of light can be enhanced. As a result, the change, by the optical beam, in the reflectivity of the information layer can be increased, and it is possible to reduce the effective reproducing spot more effectively.

Moreover, by increasing the transparency of the responsive film, it becomes possible to increase the thickness of the responsive film. Thus, it is possible to increase the optical path difference between the respective rays of the light repeatedly reflected by the responsive film, thereby increasing the phase difference. Even when the change in complex refractive index which depends on the intensity of the incident light is small, it is possible to increase the change in reflectivity of the information layer by enhancing the effect of multiple interference of light. Therefore, it is possible to reduce the effective reproducing spot more effectively.

In the arrangement in which the change in reflectivity is caused by the change in structure of the multiple interference of light, it is possible to carry out the super-resolution reproduction by adjusting materials for the optical information recording medium, without drastically changing the arrangement of the conventional reproducing device or recording/reproducing device. Therefore, the optical information recording medium of the present invention is compatible with the existing optical disc.

In order to solve the above-described problems, the optical information recording medium of the present invention includes an information layer for enabling reproduction of information recorded thereon, with irradiation of an optical beam, and the information layer includes: a light-absorbing film which absorbs a part of the optical beam so that a temperature of the information layer increases; and a responsive film whose complex refractive index changes according to a change in temperature.

According to the above arrangement, when the optical beam is incident on the optical information recording medium, the light-absorbing film absorbs a part of the optical beam so that the temperature of the information layer is increased. Moreover, there is the intensity distribution of the optical beam in the light spot which is the irradiation area of the optical beam, so that the temperature distribution is generated in the light spot. On this account, the temperature distribution is generated in the responsive film of the light spot. As a result, the complex refractive index of the responsive film changes, and the complex refractive index is distributed. In this way, the reflectivity in the light spot changes according to the temperature distribution generated according to the intensity of the light spot of the optical beam. That is, because the state of the multiple interference of light in the light spot of the information layer is distributed, the reflectivity of the information layer is distributed. As a result, it is possible to intensively read recording bits in a region, smaller than the light spot, in the light spot. In this manner, it becomes possible to successfully reduce the effective reproducing spot, thereby carrying out a super-resolution reproduction.

Moreover, according to the above arrangement, because the change in the reflectivity of the information layer occurs due to the change in the arrangement of the multiple interference of light, it is possible to carry out the super-resolution reproduction by arranging materials for the optical information recording medium, without drastically changing the arrangement of the conventional reproducing device or recording/reproducing device.

Moreover, in order to solve the above problems, the optical information recording medium of the present invention may include an information layer for enabling reproduction of information recorded thereon, with irradiation of an optical beam, and the information layer further includes (i) a recording layer for recording information with irradiation of an optical beam, for reproducing the information with irradiation of an optical beam recorded thereon, and for absorbing a part of the optical beam so that a temperature of the recording medium increases, and (ii) a responsive film whose complex refractive index changes according to a change in temperature.

According to the above arrangement, it is possible to realize the optical information recording medium capable of recording and reproducing information. Note that, as such a recording layer, for example, it is possible to use a write-once recording film, a magneto-optical recording film, a phase-change recording film, etc.

Moreover, according to the above arrangement, when the optical beam is incident on the optical information recording medium, the recording layer absorbs a part of the optical beam so that the temperature of the information layer is increased. In this way, the complex refractive index of the responsive film is changed. Then, the reflectivity in the light spot can be changed according to the temperature distribution generated according to the intensity of the optical beam. As a result, it is possible to intensively read recording bits in a region, smaller than the light spot, in the light spot. In this manner, it becomes possible to successfully reduce the effective reproducing spot, thereby carrying out a super-resolution reproduction.

Moreover, according to the above arrangement, it is not necessary to include the light-absorbing film for increasing the temperature of the responsive film. Therefore, it is possible to simplify the arrangement of the optical information recording medium.

In order to solve the above problems, a recording/reproducing method includes the step of irradiating the above optical information recording medium with an optical beam so as to change reflectivity of the information layer by changing the complex refractive index of the information layer, so as to enable recording or reproducing of information whose mark length is shorter than a diffraction limit of the optical beam.

According to the above method, it is possible to record or reproduce information whose mark length is shorter than the spot diameter of the optical beam, without drastically changing the arrangement of the conventional device.

In order to solve the above problems, a recording/reproducing device irradiates the above information recording medium with an optical beam so as to change reflectivity of the information layer by changing the complex refractive index of the information layer, so as to enable recording or reproducing of information whose mark length is shorter than a diffraction limit of the optical beam.

According to the above arrangement, it is possible to record or reproduce information whose mark length is shorter than the spot diameter of the optical beam, without drastically changing the arrangement of the conventional device.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 15b is a cross-sectional view illustrating an arrangement of a modification example of the optical disc illustrated in FIG. 15a.

FIG. 16b is a cross-sectional view illustrating an arrangement of a modification example of the optical disc illustrated in FIG. 16a.

FIG. 17b is a cross-sectional view illustrating an arrangement of a modification example of the optical disc illustrated in FIG. 17a.

DESCRIPTION OF THE EMBODIMENTS

The following explains one embodiment of the present invention.

Figure 19:
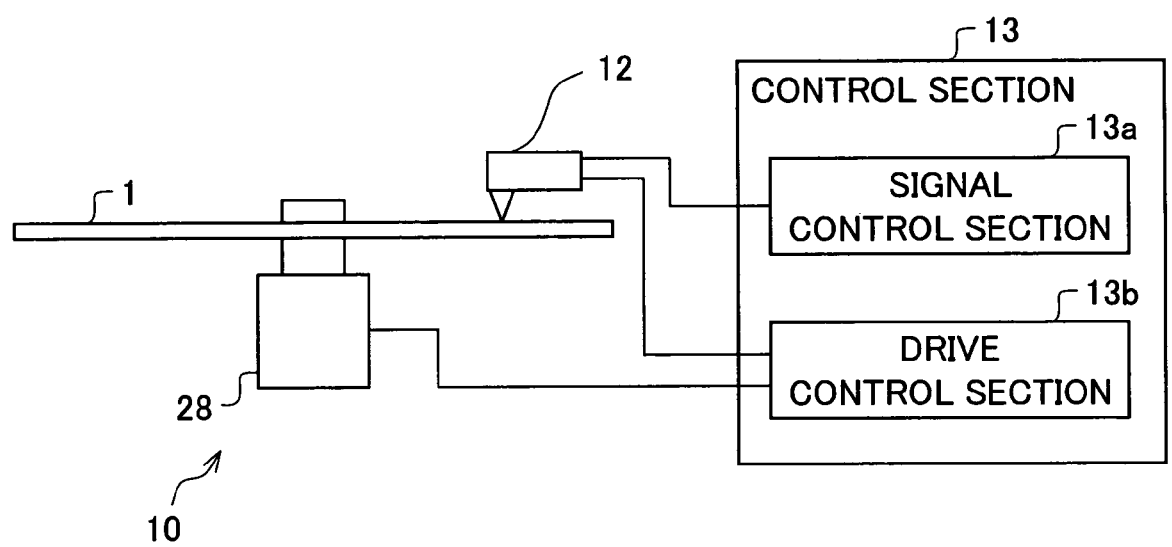
FIG. 19 is a schematic diagram illustrating an arrangement of a recording/reproducing device which is capable of recording/reproducing information from the optical disc of the present invention.
Figure 20:
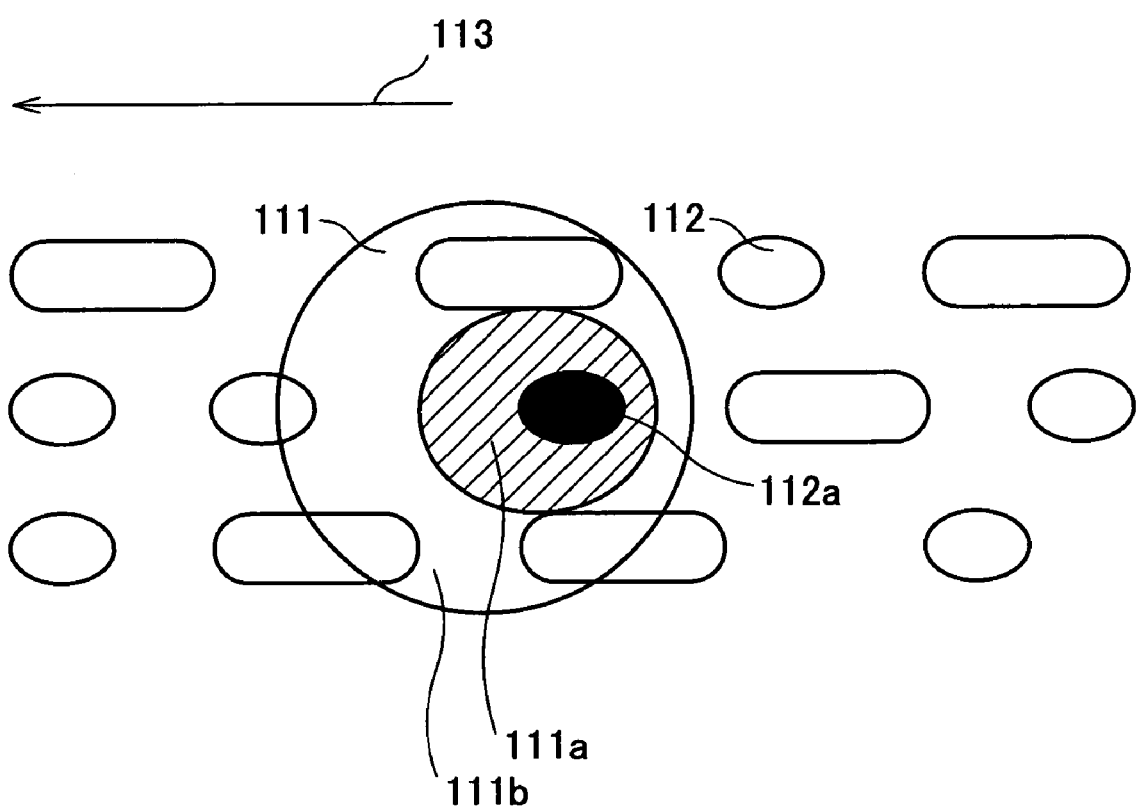
FIG. 20 is an explanatory diagram for explaining an effect of a reduced effective reproducing spot, given by the super-resolution medium technology.

FIG. 19 is an explanatory diagram illustrating a schematic arrangement of a recording/reproducing device (optical information processing device) 10 in accordance with the present embodiment. Here, the recording/reproducing device 10 records information into an optical disc (optical information recording medium) 1 of the present invention which adopts the super-resolution medium technology, by emitting an optical beam to the optical disc. Also, the recording/reproducing device 10 reproduces the information recorded in the optical disc 1 by emitting an optical beam and detecting the reflected light. Note that, in the present embodiment, the optical information recording medium is a disc-shaped optical disc, however, the present invention is not limited to this type of disc.

As illustrated in FIG. 19, in the recording/reproducing device 10, the optical disc 1 is rotated by a spindle motor (relative motion means) 28, and an optical pickup device (optical head) 12 writes information to the optical disc 1 or reads out information from optical disc 1. Note that, the optical pickup device 12 and the spindle motor 28 are controlled by a control section 13. The control section 13 includes, for example, (i) a signal control section 13a which controls signals for writing information to the optical disc 1 or reading out information from the optical disc 1 through the optical pickup device 12, (ii) a drive control section 13b which controls the spindle motor 28 and a servo means of the optical pickup device 12, etc. Note that, the signal control section 13a also acts as (i) an address information detecting means for detecting address information from electric signals obtained by reproducing an address information mark on the optical disc 1, and (ii) a reproducing signal demodulating means (reproducing signal demodulating circuit) for reproducing recorded information by reflected light, which is emitted from the optical disc 1.

Figure 18:
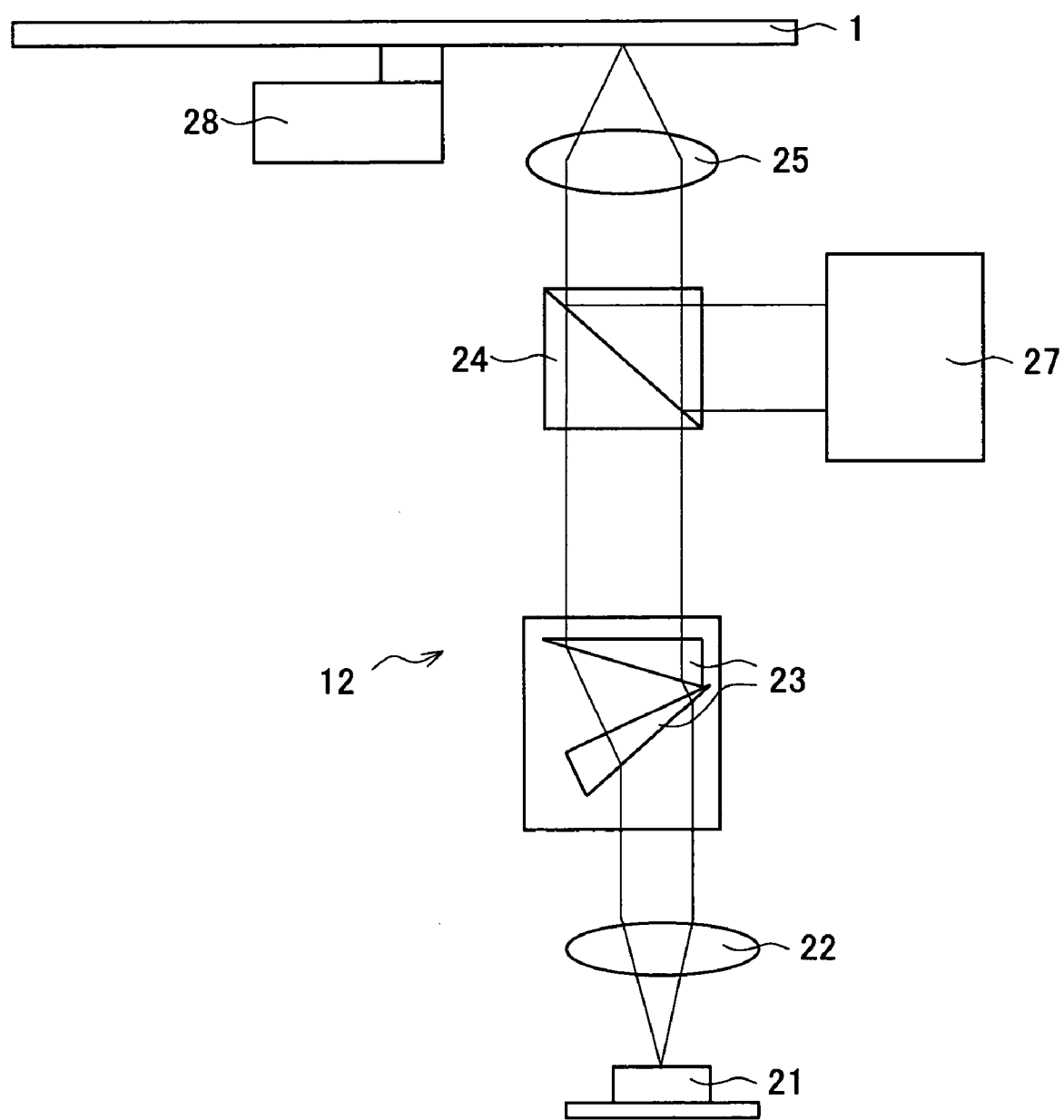
FIG. 18 is a schematic diagram illustrating an arrangement of optical system in a recording/reproducing device which is capable of recording/reproducing information from the optical disc of the present invention.

FIG. 18 is an explanatory diagram illustrating an arrangement of the optical head 12 mounted to the recording/reproducing device 10. As illustrated in FIG. 18, the optical head 12 includes a semiconductor laser (laser light source) 21, a collimator lens (light-condensing optical means) 22, a beam-shaping prism (light-condensing optical means: a prism for circularizing a beam) 23, a beam splitter (light-condensing optical means, optical system dividing means) 24, an objective lens (light-condensing optical means, condenser) 25, a detection optical system (photoelectric transfer means, (various-)signal detecting system) 27.

In the optical head 12, the semiconductor laser 21 is used as the laser light source. Note that, the present invention is not limited to this, but other light source may be used. Moreover, laser light emitted from the semiconductor laser 21 has a wavelength of 405 nm, but the present invention is not limited to this.

The light-condensing optical means produces a light beam from the laser light emitted from the semiconductor laser 21 (light source), and condenses the beam on the optical disc 1. That is, the laser light emitted from the semiconductor laser 21 is converted into a substantially parallel ray by the collimator lens 22, and the beam-shaping prism 23 shapes the parallel ray so that the parallel ray has a substantially circular light-intensity distribution. After the parallel ray whose intensity distribution is substantially circular passes through the beam splitter 24, the objective lens 25 condenses the parallel ray into an optical beam (incident light) on the optical disc 1, thereby enabling information recording to the optical disc 1. Note that, a numerical aperture (NA) of the objective lens is set to 0.65.

Further, the reflected light from the optical disc 1 is split by the beam splitter 24, and is lead to the detection optical system (photoelectric transfer means, address information detecting means, reproducing signal demodulating circuit) 27. The detection optical system 27 detects the recorded information, an out-of-focus signal, and a track displacement signal, respectively, according to a change of the reflected light from the optical disc 1; for example, a change in polarization direction, or a change in intensity of the reflected light (the level (high/low) of the reflected light). Then, the detection optical system 27 converts the detected information and signals into the electric signals. Note that, the produced electric signals are transmitted to the signal control section 13a.

According to the electric signals obtained by the light reflected from the address information mark of the optical disc 1, that is, according to the electric signals obtained by reproducing the address information mark, the signal control section (address information detecting means) 13a detects the address information including the out-of-focus signal that indicates misalignment of a light spot, which is an irradiation area of the optical disc created by the irradiation of optical beam, with respect to the optical disc 1; and the track displacement signal. Then, the address information is used to adjust the position of the objective lens 25 in a feedback manner, so that the misalignment of light spot is corrected. Note that, the optical head 12 includes the servo means for correcting the position of the objective lens 25 in response to the signals from the signal control section 13a, thus carrying out autofocusing and tracking of the laser light.

Further, the signal control section (reproducing signal demodulating circuit) 13a detects the recorded information according to the electric signals obtained by the reflected light from the recorded marks on the optical disc 1. In other words, the signal control section 13a reads out the marks recorded on the optical disc 1.

The optical disc 1 is rotated by the spindle motor (relative motion means) 11, so that the optical disc 1 is scanned by the light spot. Note that, the relative motion means may be of any form, as long as it enables the optical head 12 and the optical disc 1 to be moved relatively, for example, by rotation or parallel motions of the optical disc 1, or movement of the optical disc 1 in a direction perpendicular to an optical axis of the condenser included in the optical head 12. Examples of the relative motion means include a linear actuator, a swing arm, etc.

Moreover, the arrangement of the optical head 12 is not limited to those above. For example, the objective lens 25 and the detection optical system 27 may be stored in a different case from that storing the optical head 12.

Moreover, the optical head 12 may further include means for adjusting an angle between the laser light condensed on the optical disc 1 and the optical disc 1. With this function, it is possible to prevent deterioration of the light spot due to generation of an aberration.

It is preferable that the recording/reproducing device 10 be capable of recording/reproducing information to/from both (i) the optical disc 1 of the present invention, which adopts the super-resolution medium technology, and (ii) a generally-used optical disc, which does not adopt the super-resolution medium technology. In view of this, the recording/reproducing device 10 may be arranged such that, the control section 13 switches the levels of gains of a detecting device (detection optical system 27), the intensity of the light for reproduction, the intensity of the light for recording, record waveforms, the number of times that the optical disc 1 is rotated, etc., so that those factors are varied depending on whether the recording/reproducing device 10 uses the optical disc 1 of the present invention or a generally-used optical disc. Note that, since such switching can be carried out electrically, it is not necessary to drastically change the optical system from the structure for carrying out recording/reproduction of information only with respect to generally-used mediums.

The following explains the optical disc 1, using the super-resolution medium technology, of the present embodiment.

Figure 1:
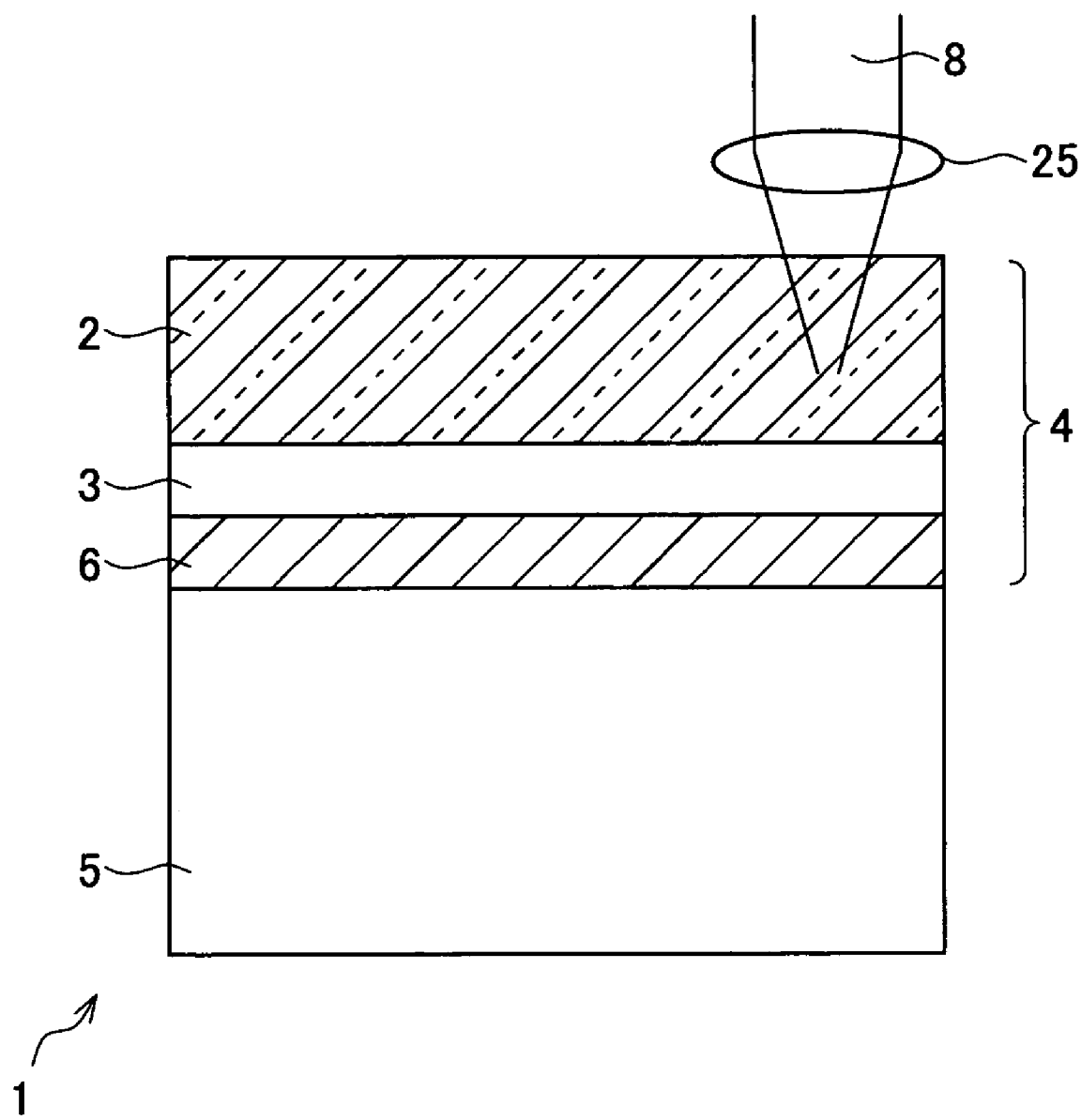
FIG. 1 is a cross-sectional view conceptually illustrating an arrangement of an optical information recording medium in accordance with the present invention, which medium uses a temperature-responsive film and brings about a medium super-resolution effect.

FIG. 1 is a cross-sectional view of the optical disc 1 in accordance with the present embodiment. As illustrated in FIG. 1, the optical disc 1 includes an information layer 4, composed of at least one thin film layer, formed on a substrate 5 on which information is recorded by phase pits. Note that, except for a particular case, which will be described later, the information layer 4 is a multilayer film which is formed by stacking a plurality of thin films.

The information layer 4 includes (i) a temperature-responsive film (responsive film) 2 changeable in complex refractive index according to the intensity of incident light, and having a superior light transmittance property, (ii) a light-absorbing film 3 which absorbs a part of the incident light so as to increase the temperature of the information layer 4, and (iii) a reflection film 6 by which light can be more efficiently used in the entire information layer 4. The change in complex refractive index of the temperature-responsive film 2 further induces a change of the condition of multiple interference of light in the information layer 4, so that the reflectivity of the information layer 4 is changed. Note that, the reflection film 6 may be omitted from the information layer 4. Moreover, instead of the reflection film 6, or in addition to the reflection film 6, various function-assisting films may be included in the information film 4 in order to assist the functions of the information layer 4. Examples of the function-assisting films include (i) a protective film for protecting the information layer 4, and (ii) a heat-insulating film for suppressing diffusing heat from the light-absorbing film.

With the information layer 4 thus arranged, when an optical beam 8 irradiates the optical disc 1, the light-absorbing film 3 absorbs a part of the incident light. This increases the temperature of the information layer 4. Moreover, in the light spot, there is the intensity distribution of the optical beam, so that a temperature distribution is generated in the light spot on the information layer 4. This further induces a temperature distribution of the temperature-responsive film 2 in the light spot. As a result, the change in the complex refractive index of the temperature-responsive film 2 is distributed. That is, there is induced a distribution of the condition of multiple interference of light in the information layer 4 in the light spot according to the optical beam. Therefore, the reflectivity in the light spot changes in response to the temperature distribution generated according to the intensity of the optical beam, and the reflectivity is distributed. As a result, it is possible to intensively read recording bits in a region, smaller than the light spot, in the light spot. More specifically, the change in complex refractive index occurs in a portion where a temperature is higher than the threshold value in the light spot on the temperature-responsive film 2. Then, the change in complex refractive index makes the condition of the multiple interference of light in the information layer 4 varied, thus changing the reflectivity of the information layer 4. In this manner, it becomes possible to successfully reduce the effective reproducing spot, thereby carrying out a super-resolution reproduction. Note that, it is preferable to use an inorganic semiconducting thin film (inorganic substance) for the temperature-responsive film 2. For the most preferable case, the inorganic semiconducting film is arranged so that a wavelength converted from the energy gap of the inorganic semiconductor, according to Equation (1) below, is close to a wavelength of the laser light for reproduction. For example, when the laser light for reproduction has a wavelength of 405 nm, it is preferable to use the inorganic semiconducting material (for example, ZnO, ZnS, ZnSe, GaN, etc) whose energy gap ranges from about 350 nm to 400 nm at room temperature. With this arrangement, an optical energy gap decreases with an increase in temperature T, according to Equation (2) below. Therefore, in a high-temperature portion, the absorption edge wavelength becomes closer to the long wavelength side, so that an absorption coefficient increases at about the wavelength of light for reproduction. As a result, the reflectivity of the high-temperature portion decreases.

$$Eg = hc/\lambda,\qquad\text{Equation (1)}$$

where Eg is energy gap, h is Planck's constant, c is velocity of light, and λ is wavelength.

$$Eg(T) = Eg(0) - a1T^2/(T+a2),\qquad\text{Equation (2)}$$

where Eg(T) is energy gap at temperature T, Eg(0) is energy gap at a temperature of 0 K, T is absolute temperature, a1 and a2 are constants varying depending on the substance (Equations (1) and (2) are quoted from Document 3).

Note that, for example, Eg of ZnO is 3.3 eV at a normal temperature (30° C.), and therefore, an optical absorption edge wavelength is 376 nm according to Equation (1). That is, ZnO is an ideal substance. Moreover, Equation (2) shows that an optical energy gap decreases with an increase in temperature.

Figure 2:
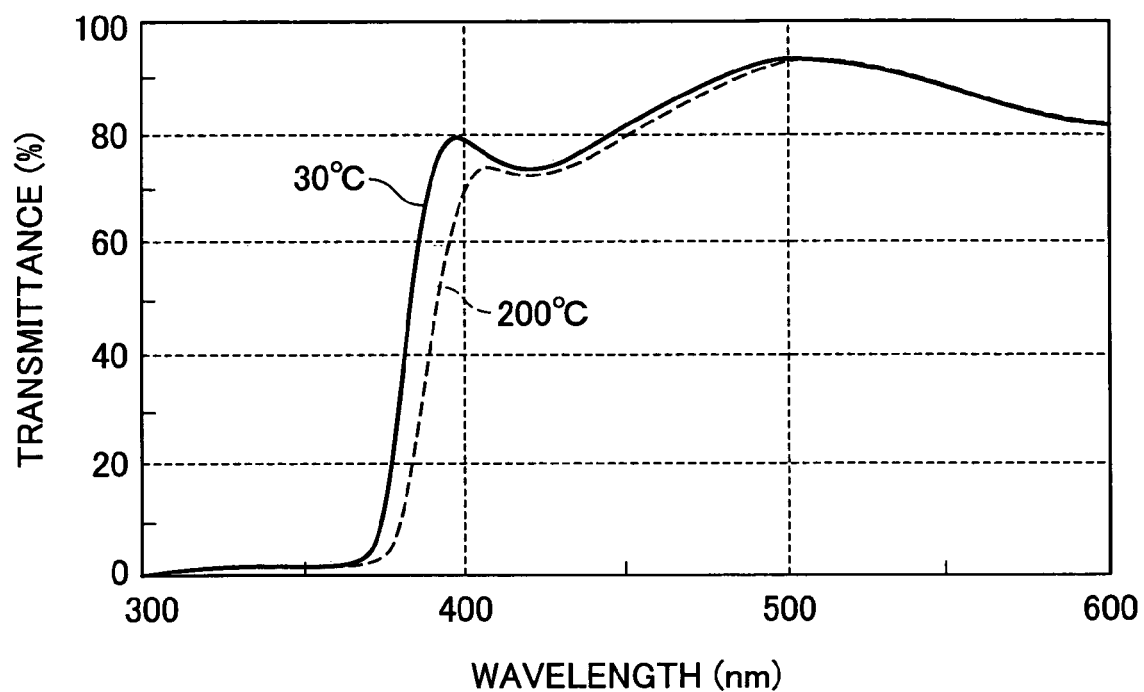
FIG. 2 is a graph illustrating transmittance spectrums of a ZnO single film which is the temperature-responsive film in accordance with the present invention.

FIG. 2 illustrates measured data of a transmittance spectrum of a ZnO film (220 nm in thickness) at 30° C. and a transmittance spectrum of a ZnO film (220 nm in thickness) at 200° C. As illustrated in FIG. 2, the optical absorption edge wavelength is substantially 376 nm at a normal temperature (30° C.), but is substantially 386 nm at a high temperature (200° C.). Therefore, the optical energy gap is substantially 3.2 eV, that is, the optical energy gap becomes small. This is consistent with Equation (2). More specifically, the change in temperature (change in band gap) of the optical absorption edge of a spectral transmittance demonstrates Equation (2) (the theory that the band gap decreases with an increase in temperature).

As the optical energy gap decreases with an increase in temperature T, and the optical absorption edge wavelength shifts to the long wavelength side, the absorption coefficient increases at about the wavelength (405 nm) of the light for reproduction, thereby decreasing the reflectivity of the high-temperature portion.

In this way, the reflectivity of a portion of the light spot changes according to a change in temperature distribution, which depends on the intensity of the incident light, thus allowing intensive reading of the recording bits in a region smaller than the light spot, in the light spot. As a result, the effective reproducing spot is reduced, thus enabling the super resolution reproduction, which contributes to improvement in recording density.

Note that, though the case above uses a structure including (i) the light-absorbing film 3 which converts incident light into heat and (ii) the temperature-responsive film 2 which is changeable in complex refractive by a change in temperature which depends on the intensity of incident light. However, the present invention is not limited to this structure, but may be a structure using a responsive film whose complex refractive index is changed directly according to the incident light. That is, the present invention may be a structure using a responsive film, provided as an inorganic super-resolution film, which is changeable in complex refractive index in response to a change in temperature which depends on the degree of heat obtained from the incident light; otherwise, a structure in which the responsive film is changed in complex refractive index directly by the incident light. When using the responsive film whose complex refractive index is directly changed by the incident light, it is not necessary to provide the light-absorbing film 3, thereby simplifying the arrangement of the information layer 4. For example, it is possible to use a wavelength-responsive film (responsive film) whose complex refractive index is changed according to the wavelength of irradiated light. One example of such a wavelength-responsive film is a photochromic film, such as a diarylethene film, which is colored or decolored according to the wavelength of irradiated light. Moreover, it is possible to use the temperature-responsive film 2 which absorbs a part of the incident light, thus causing an increase in temperature and a change in complex refractive index. In other words, the temperature-absorbing film 2 may have the functions of the light-absorbing film 3.

By using, as the responsive film, the temperature-responsive film 2 whose complex refractive index is changed according to a change in temperature, it is possible to change the multiple interference of light in the information layer 4 by a change in temperature of the information layer 4 in the light spot, which depends on the intensity of incident light. This allows easy selection of the material of the temperature-responsive film 2. Moreover, the reflectivity can be controlled by using the change in multiple interference of light in the information layer 4 caused by a change in temperature, thereby simplifying the design of the information layer 4.

Moreover, in order to adequately obtain the effect of multiple interference of light, it is important to select a highly transparent responsive film. By using, as the responsive film, a complex refractive index changeable film which is highly transparent, it is possible to suppress the light absorption, which occurs while the light is repeatedly reflected from the responsive film, so that the light is reflected from the responsive film many times, thereby enhancing the effect of the multiple interference of light. Consequently, even when the change in complex refractive index according to the intensity of incident light is small, it is possible to increase the change in reflectivity of the information layer 4.

That is, while the light is repeatedly reflected by the responsive film, the respective rays of light interfere each other due to the phase difference caused by the optical path difference (a phenomenon where the respective rays of light intensify each other when their phases are the same, and offset (weaken) each other when their phases differ by a half wavelength), thus changing the reflectivity. When the complex refractive index changeable film is highly transparent, the amount of light repeatedly reflected by the complex refractive index changeable film increases, so that the effect of the multiple interference of light (such as the effect where the rays of light intensify/weaken each other or the each other) is enhanced. Accordingly, for the responsive film, higher transparency gives a greater change in reflectivity even when the amount of change in complex refractive index is the same or less.

Moreover, by increasing the transparency of the responsive film, it becomes possible to increase the thickness of the responsive film. Thus, it is possible to increase the optical path difference between the respective rays of the light repeatedly reflected by the responsive film, thereby increasing the phase difference. Even when the change in complex refractive index which depends on the intensity of the incident light is small, it is possible to increase the change in reflectivity of the information layer 4 by enhancing the effect of multiple interference of light. That is, by increasing the transparency of the responsive film, it is possible to increase the change in the reflectivity according to the multiple interference of light. Therefore, it is possible to reduce the effective reproducing spot more effectively.

Note that, in the case of using the temperature-responsive film 2 as the responsive film, a temperature-responsive film 2 whose extinction coefficient of the complex refractive index is 0.2 or less, or less than 0.2 at room temperature meets the required properties of the highly-transparent temperature-responsive film 2 by which the effect of the multiple interference of light is adequately obtained.

The highly-transparent temperature-responsive film 2 can be a thin film made of any one of an oxide, a nitride, a sulfide, a fluoride and a carbide, each of which is a combination of elements containing a plurality of compounds. Especially, a temperature-responsive film 2 using any one of an oxide, a nitride, a sulfide, a fluoride and a carbide, each of which is a combination of three or more elements, has advantages of resistance to the high temperature upon recording, and endurance for many readouts.

Concretely, the temperature-responsive film 2 may be made of an oxide thin film containing Zn, a sulfide thin film containing Zn, a carbide thin film containing Si, an oxide thin film containing Ce or an oxide thin film containing Sn. More concretely, it is possible to use a ZnO thin film, a ZnS thin film, an SiC thin film, a $CeO_2$ thin film or an $SnO_2$ thin film.

As for ZnS it is acceptable to use a $ZnO$—$SiO_2$ transparent film, which is a mixture of ZnO and $SiO_2$, in consideration of strength, toughness and compatibility with a medium adjacently provided. Moreover, by using the temperature-responsive film 2 as the responsive film, and providing the light-absorbing film 3 which induces an increase in temperature of the information layer 4 by absorbing a part of the light, it becomes possible to effectively convert light into heat. That is, provision of light-absorbing film 3 offers further increase in temperature in the high-temperature portion in the beam spot, with the same intensity of incident light, thereby causing a greater reflectivity difference between the high-temperature portion and other portion in the beam spot. On this account, it is possible to enlarge a smaller signal upon reproduction.

Though reflectivity is not required for the light-absorbing film 3. The light-absorbing film 3 can be made of a thin film which absorbs a certain amount of light, thus increasing the temperature in response to an optical beam. Examples of such a thin film include (i) a semiconductor, such as an Si film, a Ge film, etc., and (ii) a semimetal, which is a material in which a valence band and a conduction band are slightly overlapped, such as boron, silicon, germanium, arsenic, stibium, tellurium, and polonium. Other possible material is (i) a phase-change medium film made of GeSbTe, AgInSbTe, SbTe, etc., whose property changes between a crystalline state and an amorphous state depending on the temperature, and (ii) a magneto-optical recording film (magneto-optic recording film) made of TbFeCo, GdTbFe, DyFeCo, TbDyFeCo, etc., having a magneto-optic property causing Kerr effect, which induces rotation of the polarized wave plane in response to irradiation of laser light.

In the arrangement in which the change in reflectivity is caused by the change in structure of the multiple interference of light, it is possible to carry out the super-resolution reproduction by adjusting materials for the optical disc 1, without drastically changing the arrangement of the conventional reproducing device or recording/reproducing device. Therefore, the optical disc 1 is compatible with the existing optical disc.

Moreover, the optical disc 1 is so arranged that the reflectivity, which is induced by the multiple interference of light, of the information layer 4 changes when the intensity of the incident light is equal to or more than a predetermined value. Because the reflectivity, which is induced by the multiple interference of light, of the information layer 4 changes when the intensity of the incident light is equal to or more than the predetermined value, it is possible to narrow an intermediate transition region which is a boundary between a masked region and a reproduction region in the light spot, as compared with the case in which the reflectivity changes gradually according to the intensity of incident light. On this account, it is possible to more intensively read out the recording bits in the reproduction region, thereby reducing noises and improving the quality of signals. Note that, the degree of change in reflectivity, which is induced by the multiple interference of light, of the information layer 4 depends on the intensity of incident light, and it is preferable that the difference in degree is from −15% to 350% between the incident light whose intensity is equal to or more than a predetermined value, and the incident light whose intensity is less than the predetermined value. In this way, it becomes possible to effectively narrow the intermediate transition region which is a boundary between the masked region and the reproduction region in the light spot, thereby more easily carry out intensive readout of the recording bits in the reproduction region. On this account, it is possible to reduce noises and improve the quality of signals.

Moreover, the optical disc 1 has a reflection preventing structure in which the reflectivity, which is induced by the multiple interference of light, of the information layer 4 is a local minimal value, or is substantially a local minimal value in the vicinity of the wavelength of incident light, on condition that the complex refractive index of the responsive film 2 does not change (i.e., in a state where the optical disc 1 is not irradiated with a focused light for enabling reproduction of signals from an optical information recording medium). That is, the optical disc 1 has a reflection prevention structure using the multiple interference of light. Moreover, the light-absorbing film 3 increases the temperature of the information layer 4 by effectively absorbing the incident light. On this account, the reflection preventing structure is collapsed in a region, smaller than the light spot by light irradiation, thereby obtaining high reflectivity. On this account, it becomes possible to intensively read out the recording bits in the region, and the effective reproducing spot is reduced, thereby carrying out the super-resolution reproduction.

The information layer 4 with such a reflectivity using the effect of multiple interference of light may further include other thin films than the complex refractive index changeable film (responsive film) as various function-assisting films, such as (i) a reflection film 6 which is a function-assisting film for improving light usage efficiency in the entire information layer 4, (ii) a function-assisting film for assisting the change in complex refractive index, which depends on the intensity of the incident light, of the responsive film, (iii) a function-assisting film, such as a protective film for protecting the information layer 4, etc.

Note that, in FIG. 1, the information layer 4 is composed of three thin films, however, the information layer 4 may be composed of only the temperature-responsive film 2 and the light-absorbing film 3 as described above or may be composed of the temperature-responsive film 2, the light-absorbing film 3, and some other thin films (function-assisting films)

The reflection layer 6 reflects the light of the optical beam 8 having passed through the temperature-responsive film 2 and the light-absorbing film 3, so that the optical beam 8 returns to the temperature-responsive film 2 and the light-absorbing film 3. In this way, the reflection layer 6 improves efficiency of light usage in the entire information layer 4. As to the material of the reflection film 6, it is possible to use an Al film, an Ag film, an Au film, an alloy including one of those films as a main component, an alloy mixed with other metal, other pure metals, and a thin film made of an alloy. According to an object of the present invention, it is preferable to use a thin film with high reflectivity.

Moreover, for example, when the responsive film is realized by the temperature-responsive film 2, whose complex refractive index changes according to the change in temperature induced by the light-absorbing film 3 which changes light into heat, it is possible to use another function-assisting film, which is a heat-insulating film for suppressing diffusion of heat, generated by the light-absorbing film 3, into other films than the temperature-sensitive film 2.

Moreover, for example, the protective film for protecting the light-absorbing film 3 (information layer 4) may be provided as the function-assisting film. Because the temperature of the light-absorbing film 3 increases by light absorbing of the light-absorbing film 3, the increase in temperature easily occurs. Therefore, when the light-absorbing film 3 is directly formed on the substrate 5, the light-absorbing film 3 may break, deteriorate, oxidize, etc. In view of this, provision of protective film for the light-absorbing film 3 is preferable.

Note that, the protective film 5 is preferably provided, for example, between the substrate 5 and the light-absorbing film 3, between the reflection film 6 and the light-absorbing film 3, etc. Moreover, in order to protect the light-absorbing film 3, it is preferable that the protective film be provided adjacent to the light-absorbing film 3.

By providing the protective film in such a manner, it is possible to ensure an effect of preventing the light-absorbing film from oxidizing or deforming, as well as an effect of protecting the substrate 5 from deforming or other defects due to an increase in temperature of the substrate 5 by heat conduction.

Moreover, when the optical disc 1 includes the recording layer for recording information, the recording layer is provided as a part of the information layer 4, except for the case where information is recorded in the form of pits (phase pits) making depression/projection on the substrate 5. As the recording layer, it is possible to use a write-once recording film, a magneto-optical recording film, a phase-change recording film, etc.

Especially, when the information layer 4 includes the recording film (recording layer), it is possible to use a recording layer whose temperature is increased by absorption of light upon reproducing or recording. In this case, the recording layer can also act as the light-absorbing film 3. Moreover, in this case, the information layer 4 may omit the light-absorbing film 3 for increasing the temperature of the temperature-responsive film 2 since a desired object of the present invention can be achieved by a minimum structure composed of the temperature-responsive film 2 and the recording film. Moreover, when the recording film is included, the protective film for protecting the recording layer (information layer 4) may be provided in the information layer 4.

Moreover, when the information layer 4 includes the recording layer and a resin layer (protective layer) for protecting the recording layer, it is preferable that all the thin films be made of inorganic substances, except for the recording layer and the protective film. With this arrangement, the information layer 4 hardly breaks by heat, thereby improving durability with respect to repetitive reproduction and recording/reproducing.

Note that, the above-described particular case, where the information layer 4 is composed of a monolayer, refers to a structure where information is recorded in advance in the form of pits making depressions and projections on the substrate 5, and only the responsive film is provided as the information layer 4 on the substrate 5.

Moreover, the substrate 5 may have a single or plural information layer. By providing a plurality of information layers 4 whose reflectivity changes according to the intensity of incident light, it is possible to realize a multi-recording-section structure having a plurality of recording layers or recording surfaces which store information in the from of pits making depressions and projections on the recording surface. Therefore, a disc having such a multi-recording-section structure has a larger recording capacity, compared to a disc of other structure, even when the discs are identical in size.

In this case, it is preferable that the information layers 4 be provided with an interval from 2 µm to 20 µm, more preferably, from 10 µm to 20 µm. By setting the interval as above, it becomes easy to provide a plurality of recording layers or recording surfaces. Moreover, accuracy and manufacturing efficiency are improved.

Moreover, in FIG. 1, the optical disc 1 is arranged such that the information layer 4 is provided closer to a light receiving side than the substrate 5, and the optical beam 8 is incident on the information layer 4. However, the optical disc 1 can alternately be arranged so that the light is incident on the substrate 5 and then reaches the information layer 4.

In the former arrangement, the information layer 4 is provided closer to the light receiving side than the substrate 5, thereby reducing aberration etc. caused by inclination and birefringence of the substrate 5, etc., and therefore, this structure achieves higher density than the arrangement in which light irradiates the information layer 4 via the substrate 5.

In the latter arrangement, the substrate 5 is provided closer to the light receiving side than the information layer 4, thereby protecting the information layer 4. Also, a reading error hardly occurs even when the substrate 5 is damaged.

For the substrate 5, a function of appropriately strengthening the optical disc 1 is required. Moreover, the arrangement in which the optical beam 8 is incident on the information layer 4 requires no particular optical property, and the substrate 5 may be transparent or opaque. However, in the arrangement in which the optical beam is incident on the substrate 5, it is preferable that the transparency of the substrate 5 be as high as possible.

Examples of materials for the substrate 5 include (i) thermoplastic transparent resin, such as polycarbonate, glass, amorphous polyolefin, thermoplastic type polyimide, PET, PEN, or PES, (ii) thermosetting transparent resin, such as thermosetting type polyimide, or ultraviolet-curing type acrylic resin, and (iii) metals or similar substances. These materials may be used individually, or by being mixed.

Moreover, in the arrangement in which the light is incident on the information layer 4, and the temperature-responsive film 2 is provided as the responsive film, the temperature-responsive film 2 is provided closest to the light receiving side of the information layer 4, so that the temperature-responsive film is exposed to the air. Therefore, the air acts as a heat-insulator, and the heat is not easily released from the temperature-responsive film 2. On this account, it is possible to effectively change the temperature of the temperature-responsive film 2.

The following further explains the optical information recording medium of the present invention with description of enforcement examples.

EXAMPLE 1

Figure 3:
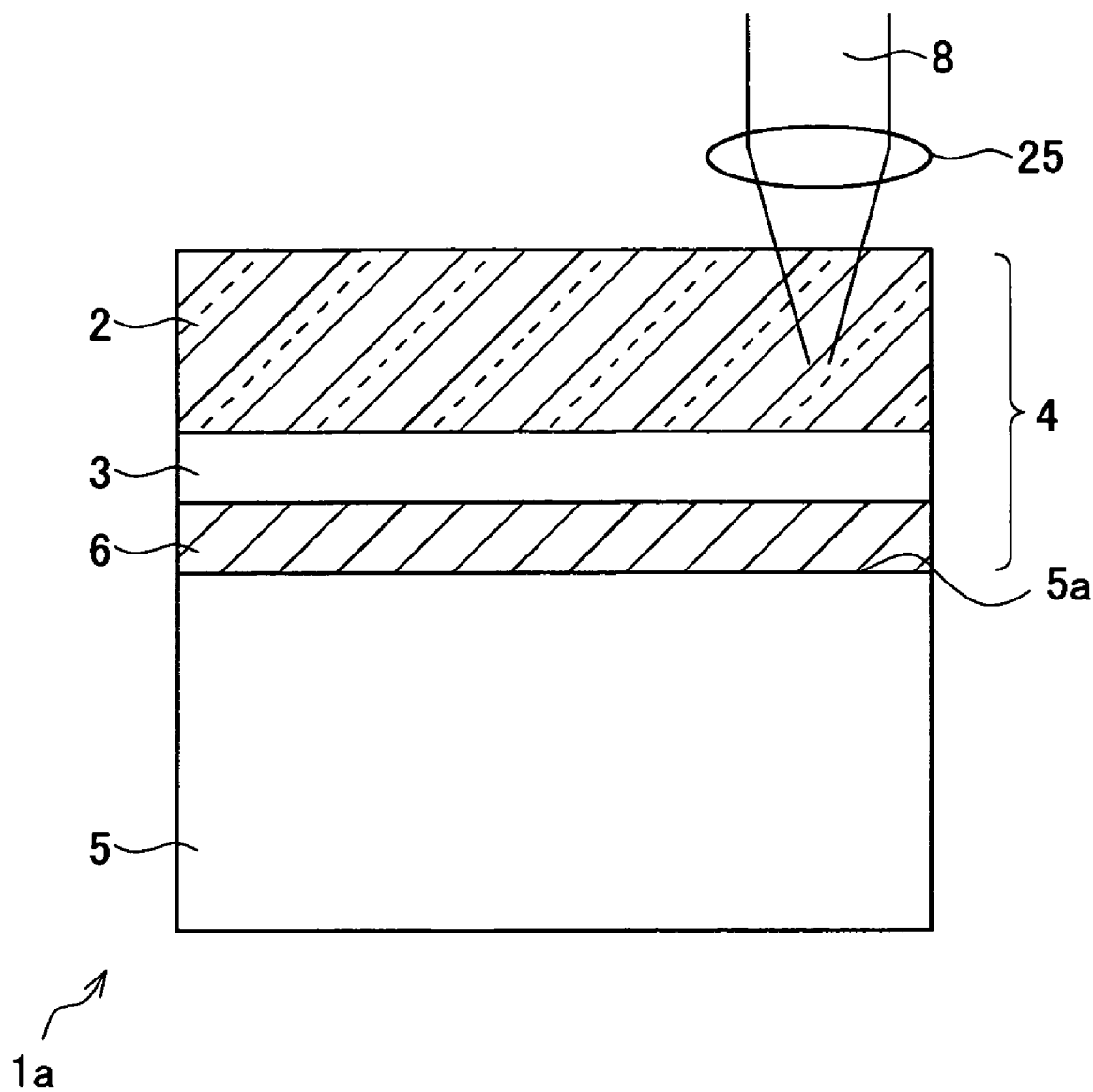
FIG. 3 is a cross-sectional view illustrating an arrangement of the optical disc in accordance with an Example of the present invention.

FIG. 3 is a cross-sectional view of an optical disc (optical information recording medium) 1a in accordance with Example 1 of the present invention. The optical disc 1a is a read-only optical disc. As illustrated in FIG. 3, the optical disc 1a includes a substrate 5 and an information layer 4 which is a multilayer film composed of a reflection film 6, a light-absorbing film 3, and a temperature-responsive film 2.

The following explains a method of producing the optical disc 1a. As the substrate 5, a polycarbonate substrate (12 cm in diameter, 1.1 mm in thickness) was used, and information was recorded in advance by forming phase pits on one surface 5a of the substrate 5. The surface 5a therefore became the recording surface of the optical disc 1a.

Next, on the recording surface 5a of the substrate 5, an Al film with a thickness=30 nm was formed by magnetron sputtering to form the reflection film 6. Then, on the reflection film 6, an Si film with a thickness=50 nm was formed as the light-absorbing film 3. Lastly, on the light-absorbing film 3, a ZnO film with a thickness=120 nm was formed as the temperature-responsive film 2. In this way, the multilayer film (information layer) 4 was formed on the substrate 5, with a three-layer structure composed of the temperature-responsive film 2, the light-absorbing film 3, and the reflection film 6, which are stacked in this order from the side on which the optical beam 8 is incident.

As described above, the present invention utilizes the effect of multiple interference of light in the information layer 4 including the temperature-responsive film 2, which is the inorganic super-resolution film. Therefore, it is important to adjust the complex refractive index and the thickness of each of the temperature-responsive film 2, the light-absorbing film 3, and the reflection film 6, which compose the information layer 4. The complex refractive index and thickness of each film were adjusted in the following manner.

First, the optical property of each of the temperature-responsive film 2, the light-absorbing film 3, and the reflection film 6 was measured by an ellipsometer. For the ZnO film forming the temperature-responsive film 2, n (refractive index)=2.16 and k (extinction coefficient)=0.00 at a normal temperature, and n=2.32 and k=0.07 at 200° C., that is, the complex refractive index (=n−ki, where i is an imaginary unit) of the ZnO film changed according to a change in temperature. Meanwhile, for the Si film forming the light-absorbing film 3, n=2.32 and k=0.07 at both a normal temperature and at 200° C., that is, the complex refractive index of the Si film did not change according to a change in temperature. Similarly, for the Al film forming the reflection film 6, n=0.41 and k=4.06 at both a normal temperature and at 200° C., that is, the complex refractive index of the Al film did not change according to a change in the temperature.

According to FIG. 2, the complex refractive index of the ZnO film forming the temperature-responsive film 2 changes with a change in temperature, so that the transmittance spectrum shifts with respect to a measurement wavelength. Moreover, looking at an arbitrary wavelength (for example, 380 nm), it is clear that the complex refractive index, which is one condition of the multiple interference of light, of the ZnO film changes with a change in temperature, further causing a change in transmittance.

Figure 4:
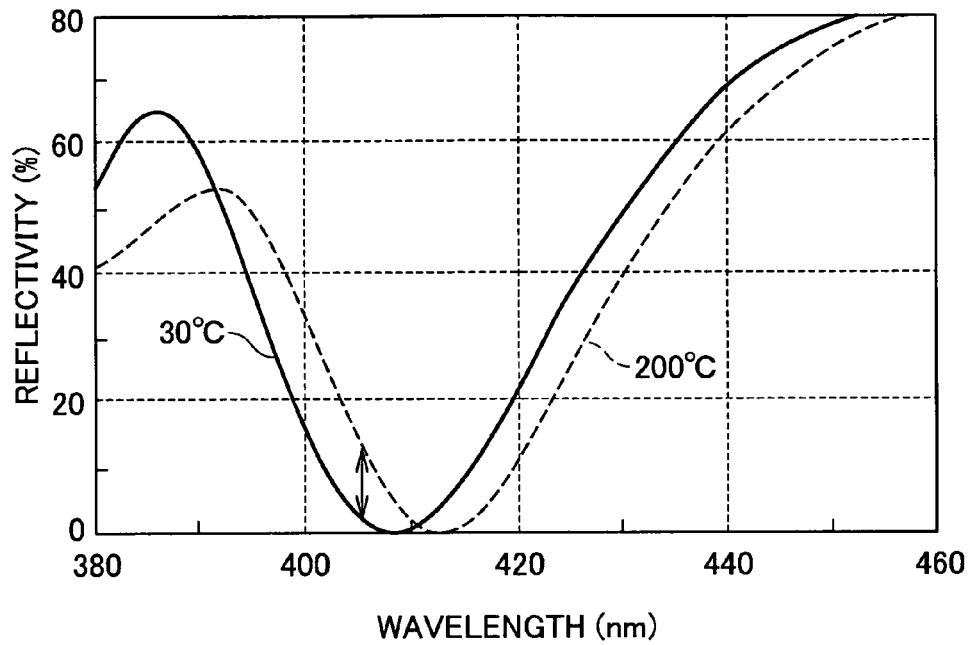
FIG. 4 is a graph illustrating transmittance spectrums in the optical disc illustrated in FIG. 3.

FIG. 4 illustrates reflectivity spectrums, respectively at 30° C. and 200° C., of the information layer 4 illustrated in FIG. 3, which is a layer composed of the ZnO film (temperature-responsive film 2, 120 nm in thickness), the Si film (light-absorbing film 3, 50 nm in thickness), and the Al film (reflection film 6, 30 nm in thickness). This reflectivity spectrum is a result of measurement of a spectral reflectivity property by a spectrograph. More specifically, FIG. 4 illustrates an incident light wavelength dependency of the reflectivity of the optical disc 1a according to Example 1, respectively measured at 30° C. and 200° C. Note that, monochromatic light of the spectrograph has intensity of about 1 µW. In the case of the ZnO film in the information layer 4, as denoted by an arrow in FIG. 4, when the wavelength is substantially 405 nm, the transmittance largely changes with a change in the temperature. According to this, it is clear that the transmittance is largely changed according to a change in temperature of the information layer 4, meaning that a great change in transmittance is obtained by a change in temperature of the information layer 4, which depends on a change in intensity of the incident light. This change in transmittance is obtained by a change in complex refractive index, which gives rise to the multiple interference of light in the ZnO film (single film). Moreover, as one of usual arrangements for optical discs, an initial transmittance, which is a default transmittance before the change is caused, can be adjusted to be a desired value by changing the thickness of the ZnO film so as to change the condition of the multiple interference of light. According to this, the adjustment in thickness of the ZnO film forming the temperature-responsive film 2 makes it possible to control the change in transmittance at a desired wavelength.

Note that, the change in complex refractive index, that is the change in transmittance, of the ZnO film with respect to the change in temperature is reversible, that is, the change in transmittance is reversible. Therefore, the characteristic of the ZnO film does not deteriorate and the transmittance returns to the original value, even when the change in temperature is repeatedly occurs.

Because the optical disc (optical information recording medium) 1a of Example 1 is arranged such that the optical beam 8 is incident on the temperature-responsive film 2, three kinds of thin films composing the information layer 4 are stacked in order of the temperature-responsive layer 2, the light-absorbing film 3, and the reflection layer 6 from a light receiving side, so that the light reaches the temperature-responsive layer 2, the light-absorbing film 3, and then the reflection layer 6 in this order.

As can be seen in FIG. 4, the reflectivity of the optical disc 1a of Example 1 has a wavy dependency with respect to the wavelength. Assumably, such a dependency was caused by the multiple interference of light in the information layer 4, which was caused when the light passes through the ZnO film forming the temperature-responsive film 2.

In the optical disc 1a in accordance with Example 1, the complex refractive index and the thickness of each of the temperature-responsive layer 2, the light-absorbing film 3, and the reflection layer 6 were adjusted to obtain the following conditions: the complex refractive index of the temperature-responsive film 2 in the vicinity of the wavelength 405 nm, which is the wavelength of the measuring light of the recording/reproducing device, does not change, and therefore the curve showing the multiple interference of light in the multilayer film 4 drops to the bottom (the local minimal value, the state in which the reflectivity is substantially 0). That is, the complex refractive index and the thickness of each of the temperature-responsive layer 2, the light-absorbing film 3, and the reflection layer 6, which composes the information layer 4, were adjusted so that the information layer 4 has the reflection prevention structure with respect to the incident light whose wavelength is 405 nm.

Moreover, when the temperature is increased from a room temperature to 200° C., the reflectivity spectrum shifts to the long wavelength side. Looking at the measured wavelength of 405 nm, the curve showing the condition of the multiple interference of light is not at the bottom, that is, the reflectivity has increased. Concretely, the reflectivity is 2% at 30° C., and 7% at 200° C., meaning that the reflectivity is changed by 250%.

That is, the complex refractive index of the ZnO film forming the temperature-responsive film 2 changes with a change in temperature, and this change in the complex refractive index further changes the condition of the multiple interference of light in the information layer 4. As a result, the reflection prevention structure is collapsed in the information layer 4, thereby increasing the reflectivity. Note that, as with the transmittance of the ZnO film, the reflectivity of the information layer 4 also changes reversibly with respect to the change in temperature: therefore, the characteristic of information layer 4 does not deteriorate and the transmittance returns to the original value even when the change in temperature repeatedly occurs.

The following more specifically explains the method of adjusting the thickness of each of the temperature-responsive film 2 and the light-absorbing film 3. The thickness of each of the temperature-responsive film 2 and the light-absorbing film 3 is determined in consideration of the following three factors.

(1) The incident light passes through the temperature-responsive film 2 and is absorbed by the light-absorbing film 3.

(2) Heat generated by light absorpsion in the light-absorbing film 3 causes an increase in temperature of the temperature-responsive film 2.

(3) The increase in temperature of the temperature-responsive film 2 changes the complex refractive index of the temperature-responsive film 2, and this further changes the state of the multiple interference of light in the information layer 4, thereby changing the reflectivity, which is induced by the multiple interference of light in the information layer 4.

Figure 5:
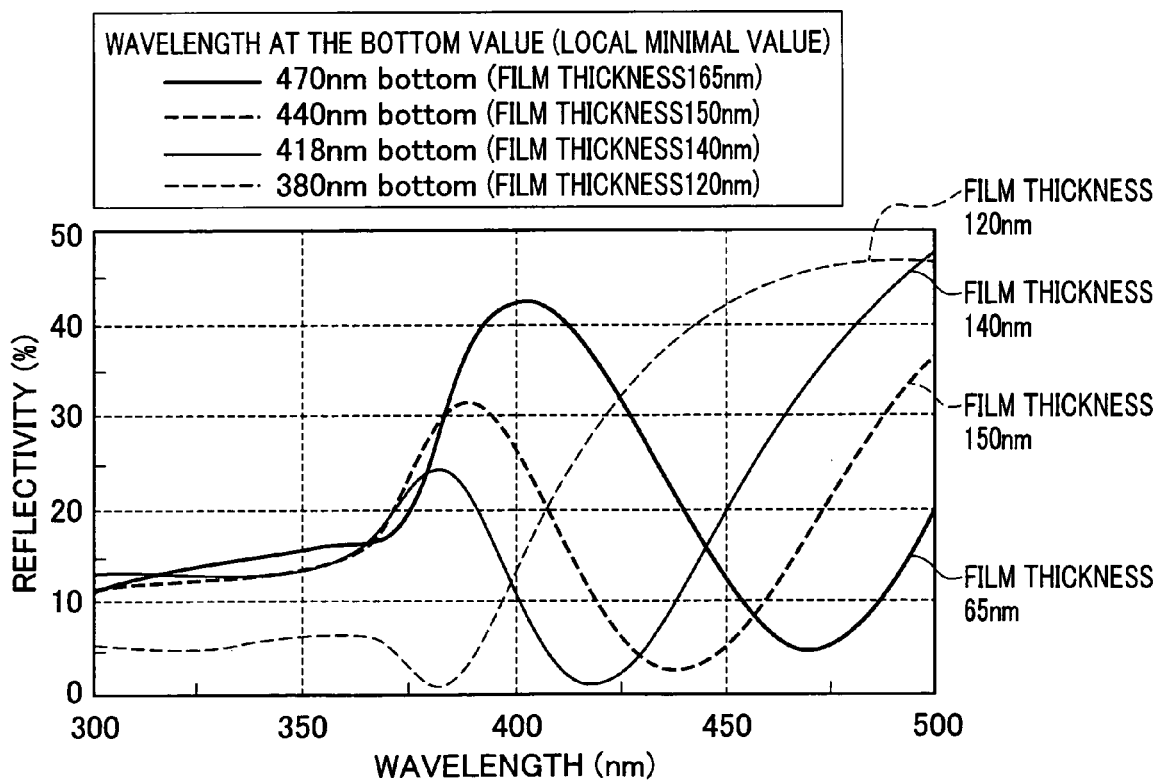
FIG. 5 is a graph illustrating reflectivity spectrums for varied thicknesses of the ZnO film serving as a temperature-responsive film.

FIG. 5 illustrates the reflectivity spectrums for varied thicknesses of the ZnO film forming the temperature-responsive film 2, that is, under different conditions of the multiple interference of light. In other words, FIG. 5 illustrates a result of measurement of spectral reflectivity property by the spectrograph when the thickness of the ZnO film forming the temperature-responsive film 2 in the optical disc 1a is varied. Note that, monochromatic light of the spectrograph has intensity of about 1 μW.

According to the figure, the wavelength at the bottom value (the point where the reflectivity drops to the local minimal value) of the interference of light can be designed desirably by adjusting the thickness of the ZnO film. That is, the condition of the change in interference of light can be changed by adjusting the thickness of temperature-responsive film 2. Note that, data illustrated in FIG. 5 is the measurement result obtained at a normal temperature, and the reflectivity for each thickness thus changes when the temperature is varied.

Table 1 shows the relationship between the wavelength at the bottom value and the thickness. Note that, the Al reflection film 34 has a thickness=20 nm in all samples.

TABLE 1

| WAVELENGTH AT THE BOTTOM VALUE (nm) | 380 | 418 | 440 | 470 |
|---|---|---|---|---|
| THICKNESS (nm) OF ZnO FILM | 120 | 140 | 150 | 165 |

Figure 6:
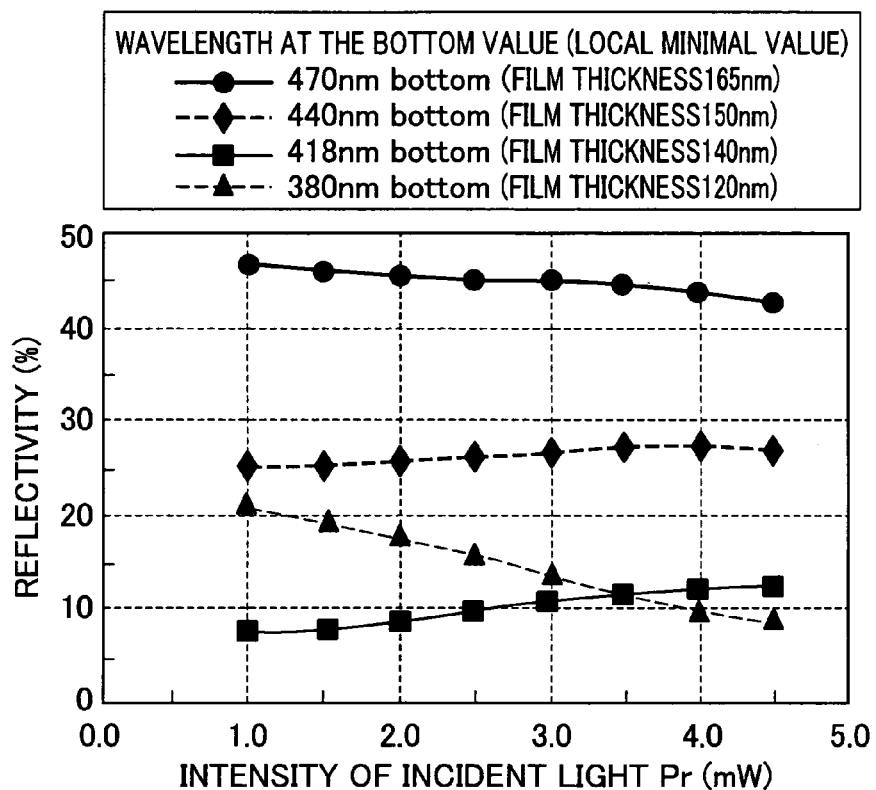
FIG. 6 is a drawing showing dependency of reflectivity on a reproducing laser power, measured by an evaluator, for varied thicknesses of the ZnO film, serving as a temperature-responsive film.

FIG. 6 illustrates a measurement result of the reflectivity, which is obtained by measuring the intensity of the reflected light with respect to the intensity of light incident on a mirror portion (a flat portion with no depression, projection, or a groove) of each medium (the samples), by using an evaluator. Note that, the incident light has a wavelength of 405 nm.

As illustrated in FIG. 6, the change in thickness of the ZnO film changed the wavelength at the bottom value of the multiple interference of light, and therefore, an absolute value of the reflectivity changed. Moreover, in the samples (each including a ZnO film with a thickness=120 nm and 165 nm) in which the wavelengths at the bottom value are 380 nm and 470 nm, respectively; an increase in intensity of the incident light caused a decrease in reflectivity. On the other hand, in the samples (each including a ZnO film with a thickness=140 nm and 150 nm) in which the wavelengths at the bottom value are 418 nm and 440 nm, respectively; an increase in intensity of incident light caused an increase in reflectivity. The is because the temperature of the medium (temperature of the temperature-responsive film 2) increases with an increase in intensity of reflected light, and the waveform of the reflectivity shown in FIG. 5 shifts to the right in FIG. 5. Note that, the relationship between the temperature and the reflectivity of the temperature-responsive film 2 will be more specifically explained later in reference to FIGS. 8 to 11.

Figure 7:
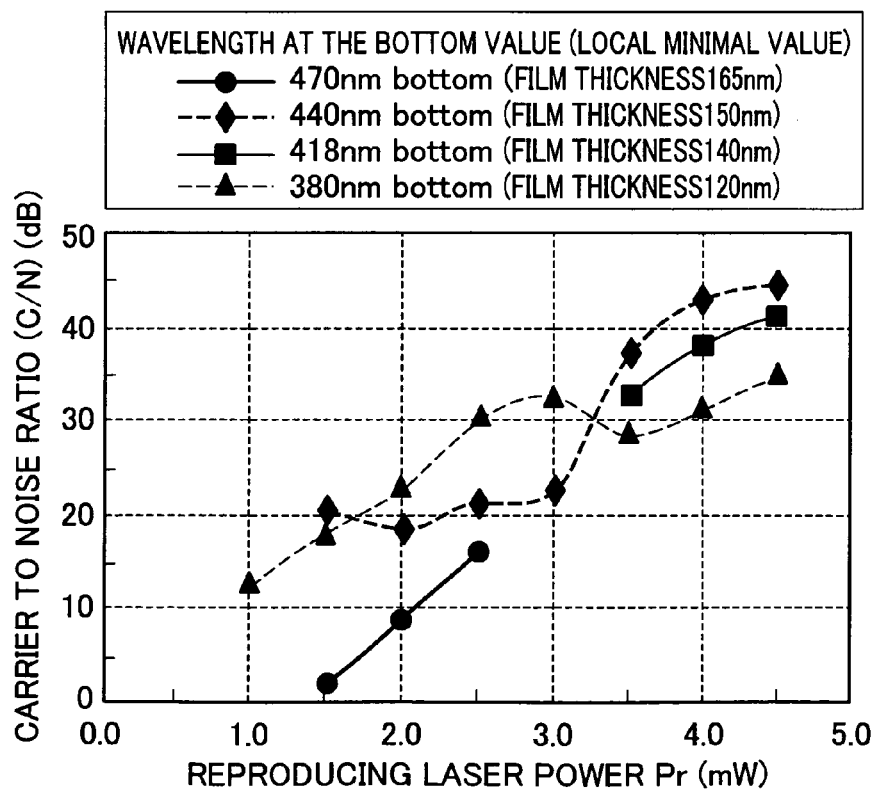
FIG. 7 is dependency of C/N ratios on a reproducing laser power, measured by an evaluator, for varied thicknesses of the ZnO film serving as a temperature-responsive film.

FIG. 7 illustrates carrier to noise ratio (C/N) with respect to a reproducing laser power, in the case where the pit lines of ROM pits, each having a length=0.14 μm, of an optical disc is reproduced by an optical pickup (405 nm in wavelength, 0.65 in numerical aperture of an objective lens, 0.16 μm in diffraction limit). As illustrated in FIG. 7, the sample (including a ZnO film with a thickness=120 nm) in which the wavelength at the bottom value is 380 nm requires the lowest power to makes a rise of signal, meaning that this sample is excellent in sensitivity. In this sample (including ZnO film whose thickness is 150 nm) whose bottom is 440 nm, the highest CN ratio is obtained in a high signal quality region with a value greater than 40 dB. Accordingly, changing the condition of multiple interference of light according to the desired recording density (pit length) allows two ways of designing of structure: a high sensitivity structure and a high signal quality structure.

Note that, conditions for measuring the CN ratio were 3.0 m/s in linear velocity and 30 kH in spectrum analyzer RBW. Each of the samples obtained a large CN ratio when the ROM pit length was 0.14 μm, which is shorter than the optical diffraction limit (0.16 μm). Therefore, all the samples were turned out as so-called optical super-resolution mediums. Moreover, another optical film was made of the same substrate 5 as that for the above samples. This optical film includes only the Al reflection film 6 and does not include the temperature-responsive film 2. The CN ratio of this film was substantially 0 when the ROM pit length was 0.16 μm.

Figure 8:
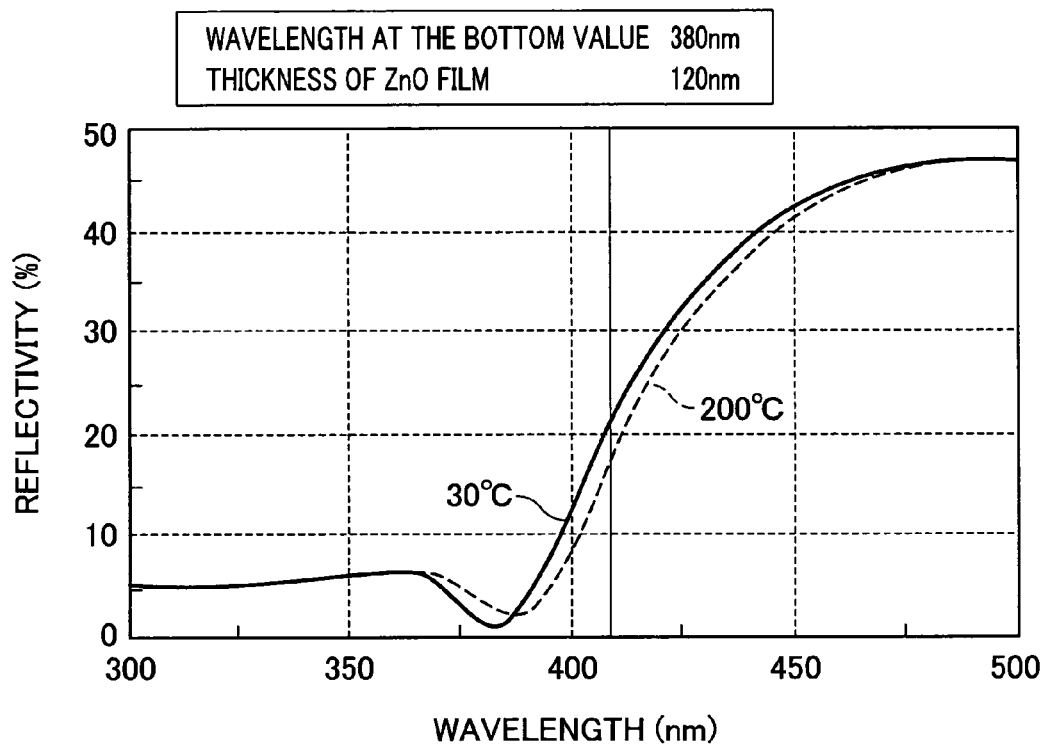
FIG. 8 is a graph illustrating reflectivity spectrums for a 120 nm ZnO film serving as a temperature-responsive film.
Figure 9:
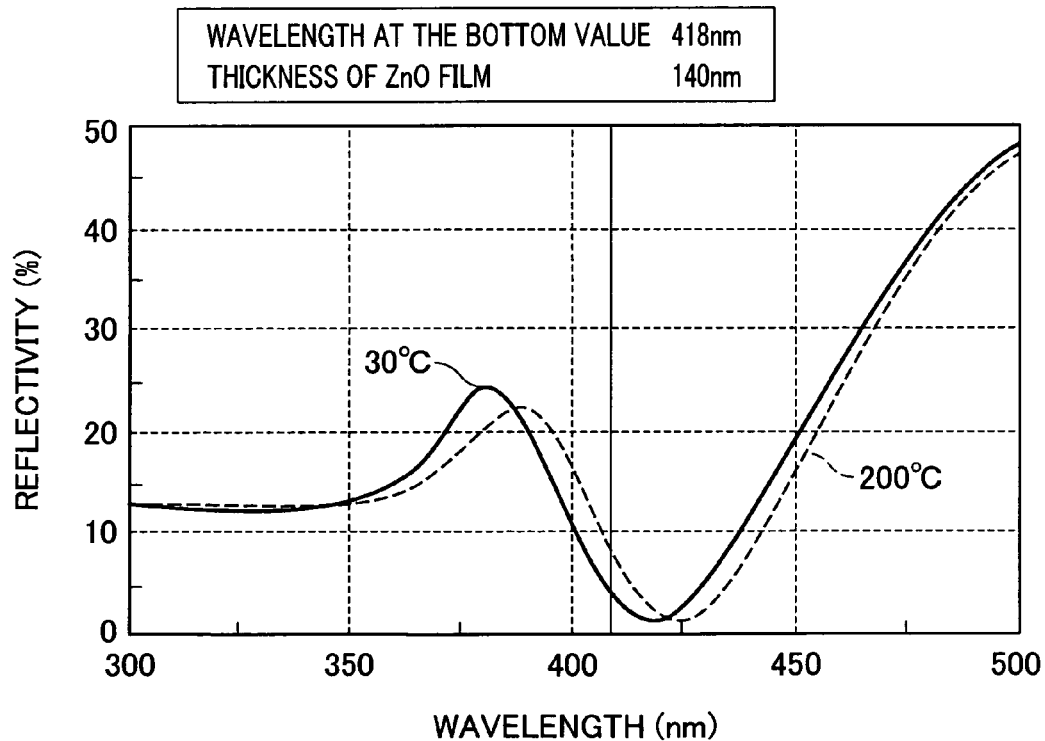
FIG. 9 is a graph illustrating reflectivity spectrums for a 149 nm ZnO film serving as a temperature-responsive film.
Figure 10:
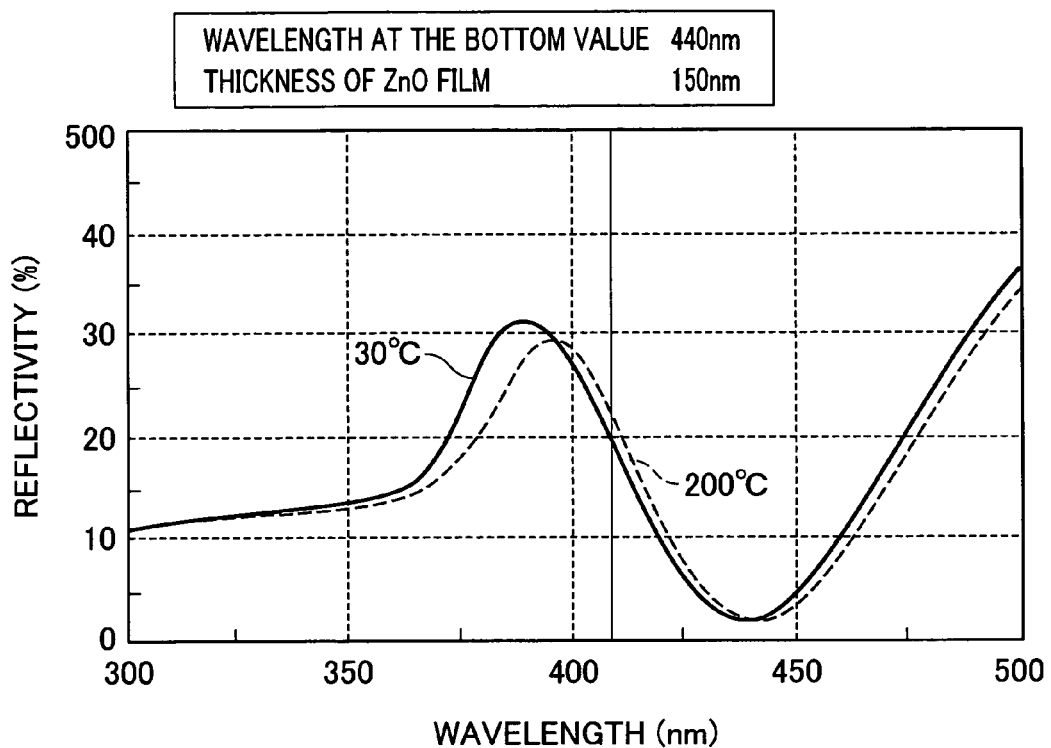
FIG. 10 is a graph illustrating reflectivity spectrums for a 150 nm ZnO film serving as a temperature-responsive film.
Figure 11:
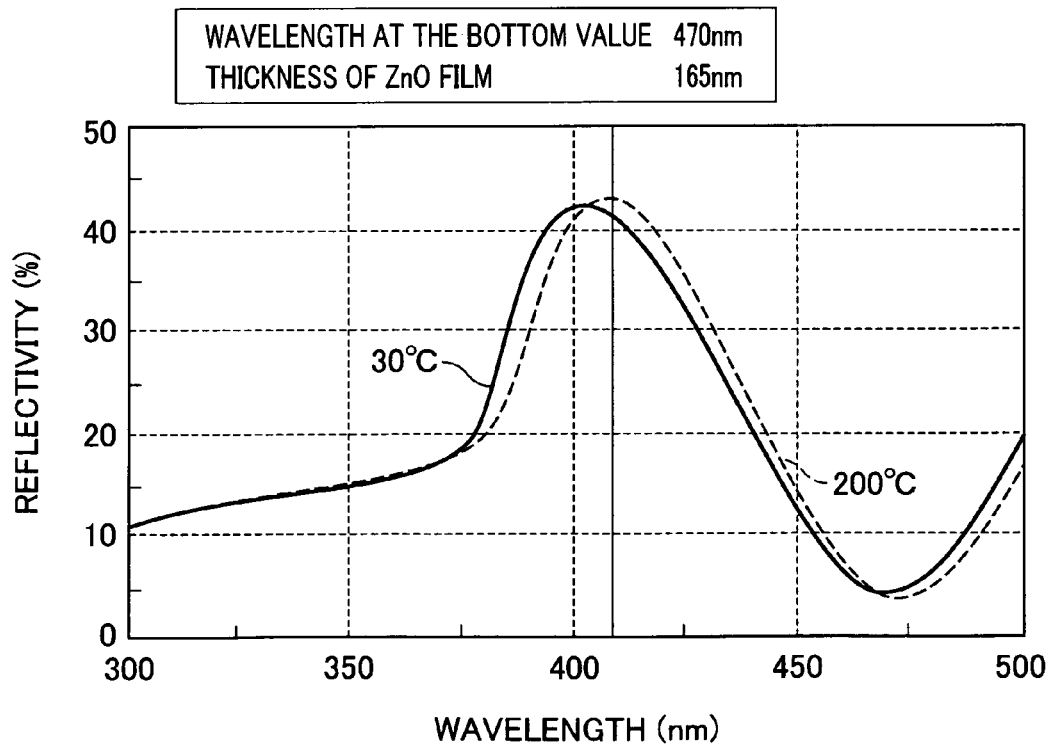
FIG. 11 is a graph illustrating reflectivity spectrums for a 165 nm ZnO film serving as a temperature-responsive film.

FIGS. 8 to 11 illustrate respective temperature dependencies of reflectivity for the ZnO films of FIG. 5 having different thicknesses. FIG. 8 illustrates the temperature dependency of reflectivity for a 120 nm thick ZnO film (temperature-responsive film 2) in which the wavelength at the bottom value of interference of light is 380 nm at room temperature. FIG. 9 illustrates the temperature dependency of reflectivity for a 140 nm thick ZnO film in which the wavelength of the bottom value of interference of light is 418 nm at room temperature. FIG. 10 illustrates the temperature dependency of reflectivity for a 150 nm thick ZnO film in which the wavelength of the bottom value of interference of light is 440 nm at room temperature. FIG. 11 illustrates the temperature dependency of reflectivity for a 165 nm thick ZnO film in which the wavelength of the bottom value of interference of light is 470 nm at room temperature.

FIGS. 8 to 11 illustrate a change in the reflectivity at 30° C. and at 200° C. As illustrated in FIGS. 8 to 11, the reflectivity is changed by about 15% (from 20% to 17%) in FIG. 8, by about 110% (from 4% to 8.5%) in FIG. 9, by about 10% (from 20% to 22%) in FIG. 10, and by about 4% (from 42% to 44%) in FIG. 10. However, in an actual reproduction, the reflectivity changes as shown in FIG. 6. For example, in FIG. 6, when the wavelength of bottom value is 418 nm (the 140 nm thick ZnO film), the reflectivity is 8% with respect to the intensity of incident light=1.0 mW. However, when the intensity of iincident light is 4.0 mW, the reflectivity increases to about 13%. Therefore, it is likely that the upper limit of the temperature is more than 200° C.

Note that, in FIG. 6, in the case where the wavelength of bottom value is 418 nm, the reflectivity increases at a rate of 1.67%/mW when the intensity of incident light increases from 1.0 mW to 4.0 mW. Thus, by using the information layer 4 whose reflectivity is changed according to the intensity of incident light, it is possible to narrow the intermediate transition region which is a boundary between the masked region and the reproduction region in the light spot, as compared with the case where the reflectivity gradually changes according to the intensity of incident light. On this account, it is possible to intensively read out the recording bits in the reproduction region. As a result, noises are reduced and the quality of signals is improved.

When the upper limit of the temperature is greater than 200° C., the waveforms of reflectivity spectrums in FIG. 8 to 11 shift further to the long wavelength side than the waveforms of the reflectivity spectrums with the temperature=200° C. On this account, in FIGS. 9 and 10, the reflectivity may increase by a greater degree than that of the case where the temperature is 200° C. illustrated in FIGS. 9 and 10. That is, in FIGS. 9 and 10, the waveforms of the reflectivity spectrums shift to the long wavelength side, so that the reflectivity is further increased when the wavelength is 405 nm, which is the wavelength of the incident light. Meanwhile, in FIGS. 8 and 11, when the upper limit of the temperature is greater than 200° C., the waveform of the reflectivity spectrum shifts further to the long wavelength side than the waveform of the reflectivity spectrum with the temperature=200° C., and therefore, the reflectivity decreases by a greater degree than the case in which the temperature is 200° C., shown in the figures.

Note that, in order to further increase the recording density, the ZnO film forming the temperature-responsive film 2 preferably has such a composition that the complex refractive index steeply changes at a threshold value which is set within the range of 60% to 85% of a peak temperature of the temperature distribution generated by the light spot. In this view, only the central region in the light spot has a region where the reflectivity changes, thereby reducing the effective reproducing spot and further increasing the recording density.

Such composition can be made with adjustment of the optical property by changing the composition of the temperature-responsive film 2 as described above, but may also be made with adjustment of structure of the interference of the information layer 4. More specifically, in FIG. 8, though the reproduction light wavelength 405 nm lies to the right of the bottom (position where the reflectivity is the local minimal value) value of the reflectivity, which is 380 nm, at 30° C., the wavelength 405 nm may lie at the bottom or to the left of the bottom.

Moreover, as illustrated in FIG. 9, when the reflectivity of reproduction light, having the wavelength of 405 nm, lies to the left of the bottom value at 30° C., the bottom moves to the right with an increase in temperature, so that the reflectivity at the wavelength 405 nm increases. Therefore, it is possible to increase the reflectivity in a high-temperature region of the beam spot, thus further reducing the effective reproducing spot.

Moreover, as illustrated in FIG. 8, when the reflectivity of reproduction light, having the wavelength of 405 nm, lis to the right of the bottom value at 30° C., the bottom moves to the right with an increase in temperature, so that the reflectivity at the wavelength 405 nm decreases. Therefore, it is possible to decrease the reflectivity in the high-temperature region of the beam spot, thereby reproducing information only from a low-temperature region of the beam spot. In this manner, reduction of the effective reproducing spot can be achieved also in an arrangement in which the reproduction is carried out only from the low-temperature region in the beam spot.

Note that, according to the optical disc 1a of Example 1, the information layer 4 is arranged such that the temperature-responsive layer 2, the light-absorbing layer 3, and the reflection layer 6 are stacked in this order from the light receiving side, on which the optical beam 8 is incident. However, the optical information recording medium of the present invention is not limited to this arrangement. Another example is described below.

EXAMPLE 2

Figure 12:
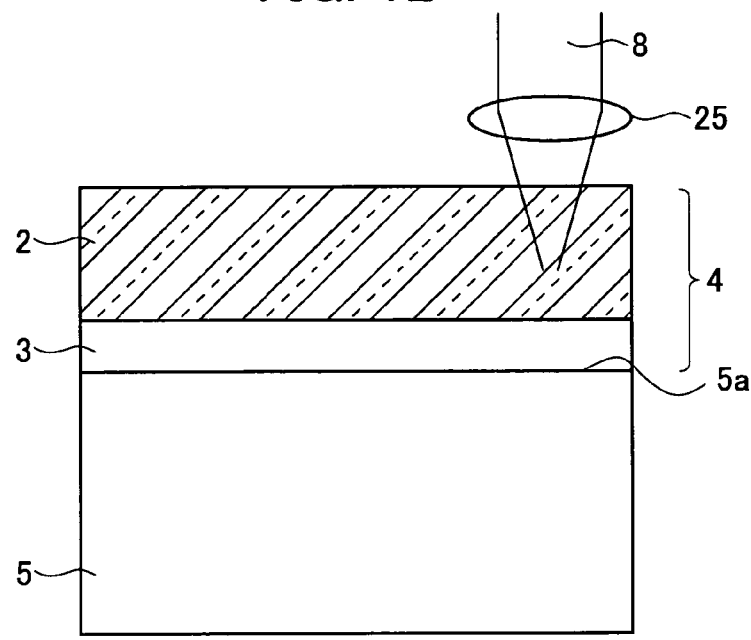
FIG. 12 is a cross-sectional view illustrating an arrangement of an optical disc in accordance with another Example of the present invention.

FIG. 12 is a cross-sectional diagram of an optical disc (optical information recording medium) 1b of Example 2. As illustrated in FIG. 12, the optical disc 1b includes a multilayer film (information layer) 4 having a two-layer structure composed of the temperature-responsive film 2 and the light-absorbing film 3, which are stacked in this order from the light receiving side. Note that, as with the optical disc 1a of Example 1, the optical disc 1b of Example 2 includes the substrate 5 which is a polycarbonate substrate (12 cm in diameter, 1.1 mm in thickness), and information is recorded in advance in the form of phase pits on a recording surface 5a of the substrate 5. Then, as with the optical disc of Example 1, an Si film with a thickness=50 nm is formed as the light-absorbing film 3 on the recording surface 5a on which the information is recorded, by the magnetron sputtering performed in Example 1 under the same conditions. Then, on the light-absorbing film 3, a ZnO film with a thickness=120 nm is formed as the temperature-responsive film 2. The optical disc 1b of Example 2 does not use the reflection film 6 of Example 1, which was provided between the light-absorbing film 3 and the substrate 5.

As with the optical disc 1a of Example 1, this structure also enables effective reduction of the effective spot diameter in the optical disc (optical information recording medium) 1b.

EXAMPLE 3

Figure 13:
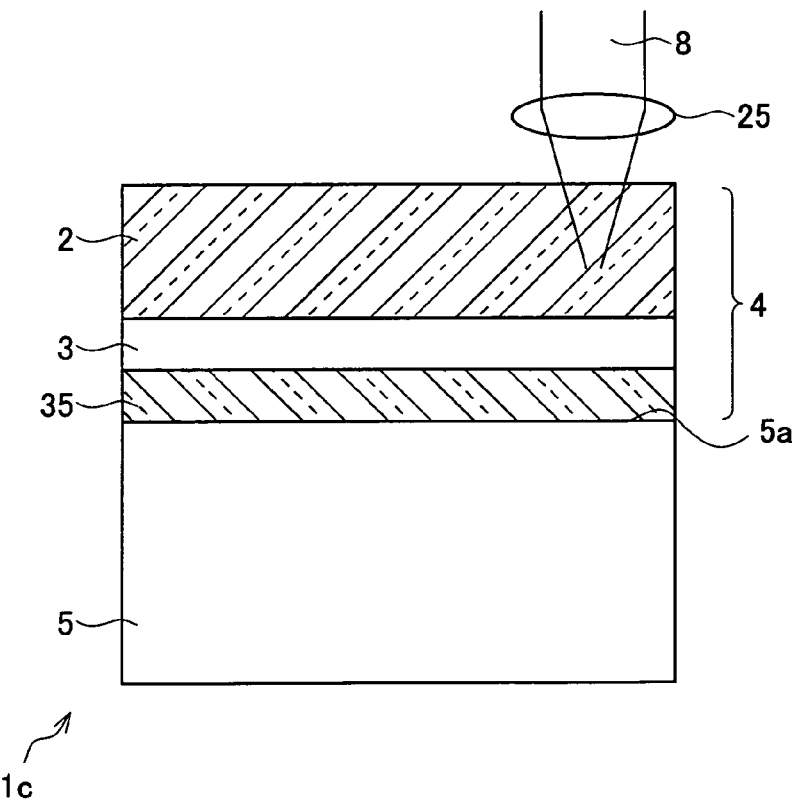
FIG. 13 is a cross-sectional view illustrating an arrangement of an optical disc in accordance with yet another Example of the present invention.

FIG. 13 is a cross-sectional diagram of an optical disc (optical information recording medium) 1c of Example 3. As illustrated in FIG. 13, the optical disc 1c includes a multilayer film (information layer) 4 having a three-layer structure composed of the temperature-responsive film 2, the light-absorbing film 3, and the reflection film 6, which are stacked in this order from the light receiving side.

Note that, as with the optical disc 1a of Example 1, the optical disc 1c of Example 3 includes the substrate 5 which is a polycarbonate substrate (12 cm in diameter, 1.1 mm in thickness), and information is recorded in advance in the form of phase pits on a recording surface 5a of the substrate 5. Moreover, in the optical disc 1c of Example 3, on the recording surface 5a on which the information is recorded, a transparent film 35 made of a SiN film of thickness 20 nm is formed by magnetron sputtering. On the transparent film 35, the light-absorbing film 3 made of the Si film of thickness 50 nm is formed in the same way as Example 1. Further, on the light-absorbing film 3, the temperature-responsive film 2 made of the ZnO film of thickness 120 nm is formed. That is, the optical disc 1c of Example 3 is arranged such that, instead of the reflection film 6 (Al film) between the light-absorbing film 3 and the substrate 5 in the optical disc 1a of Example 1, the transparent film 35 made of SiN is provided. In other words, the optical disc 1c of Example 3 has the same arrangement as that of Example 2, except that the transparent film 35 is provided between the light-absorbing film 3 and the substrate 5.

Here, the transparent film 35 functions (i) as a protective film which protects the light-absorbing film 3, and (ii) as a heat-insulating film which suppresses diffusing heat from the light-absorbing film 3 into the substrate 5, i.e., the diffusion from the light-absorbing film toward the opposite direction of the temperature-responsive film 2.

In the optical disc 1c thus arranged, it is possible to further reduce the effective spot diameter. Note that, in the present example, the transparent film 35 acts as the protective film and the heat-insulating film, but the present invention is not limited to this arrangement, but may include a protective film and a heat-insulating film separately. Moreover, the optical disk may include only one of the protective film and the heat-insulating film. Note that, the transparent film 35 can be made of a material other than the SiN film, according to the usage.

EXAMPLE 4

Figure 14:
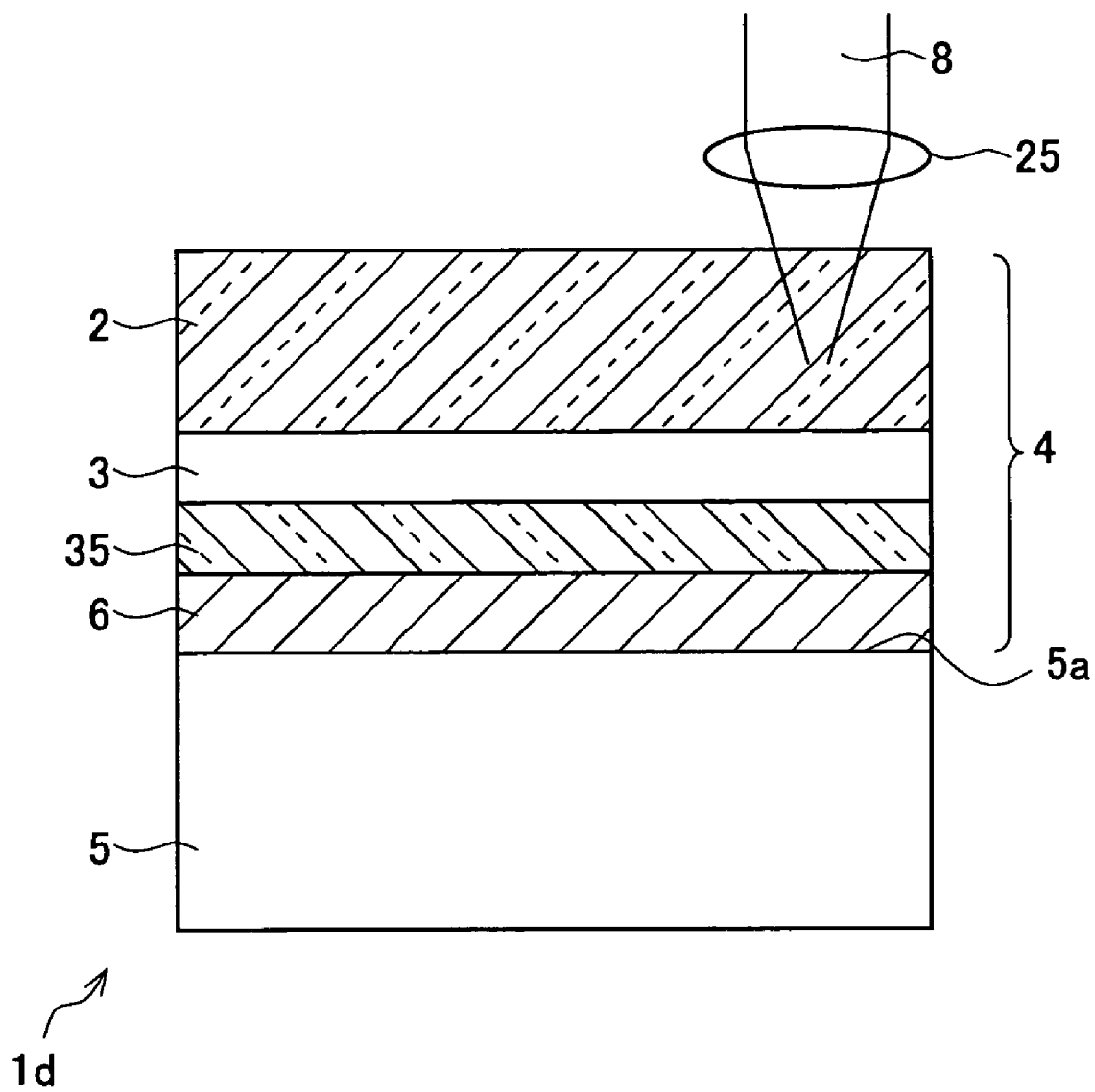
FIG. 14 is a cross-sectional view illustrating an arrangement of an optical disc in accordance with still another Example of the present invention.

FIG. 14 is a cross-sectional diagram of an optical disc (optical information recording medium) 1d of Example 4. As illustrated in FIG. 14, the optical disc 1d includes a multilayer film (information layer) 4 haing a four-layer structure composed of the temperature-responsive film 2, the light-absorbing film 3, the transparent film 35 and the reflection film 6 which are stacked in this order from the light receiving side. Note that, as with the optical disc 1a of Example 1, in the optical disc 1d, the reflection film 6 made of the Al film of thickness 30 nm is formed, on the recording surface 5a on which the information is recorded, by magnetron sputtering used in Example 1. On the reflection film 6, the transparent film 35 made of the SiN film of thickness 20 nm is formed. On the transparent film 35, the light-absorbing film 3 made of the Si film of thickness 50 nm is formed. Further, on the light-absorbing film 3, the temperature-responsive film 2 made of the ZnO film of thickness 120 nm is formed as the inorganic super-resolution film. That is, the optical disc 1d of Example 4 further includes the transparent film 35 between the light-absorbing film 3 and the reflection film 6. In other words, the optical disc 1d of Example 4 has the same arrangement as that of the optical disc 1c of Example 3, except for addition of the reflection film 6.

In the optical disc 1d thus arranged, the transparent film (protective film) 35 protects the light-absorbing film 3. Moreover, the transparent film (heat-insulating film) 35 suppresses diffusing heat from the light-absorbing film 3 into the reflection film 6, i.e., the diffusion from the light-absorbing film toward the opposite direction of the temperature-responsive film 2. On this account, it is possible to increase the temperature of the temperature-responsive film 2 more effectively, thereby improving efficiency in light usage.

Moreover, the reflection layer 6 reflects the light of the optical beam 8 having passed through the temperature-responsive film 2, the light-absorbing film 3 and the transparent film 35, so that the optical beam 8 returns to the temperature-responsive film 2 and the light-absorbing film 3. In this way, the reflection layer 6 improved efficiency of light usage in the entire information layer 4.

Therefore, it is possible to more effectively reduce the effective light spot in the optical disc 1d.

EXAMPLE 5

According to the optical discs 1a to 1d of Examples 1 to 4, the temperature-responsive film 2 is provided as the front surface of the information layer 4, exposed to the air. However, it is possible to provide a protective film on the surface of the information layer 4. The protective film is made of, for example, an ultraviolet-curing resin film.

Figure 15A:
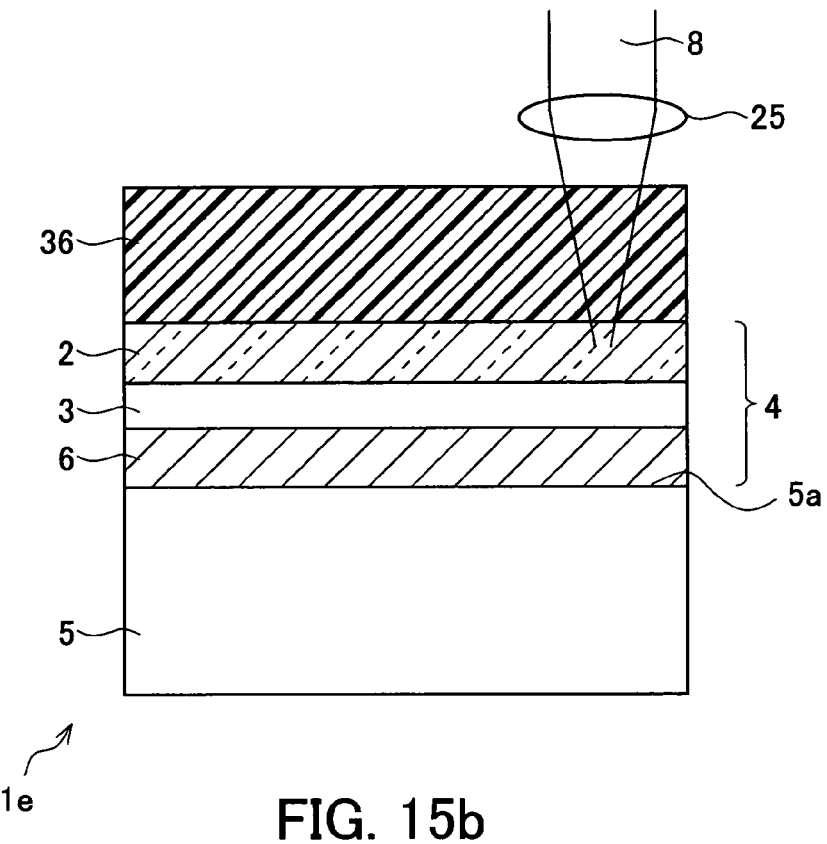
FIG. 15a is a cross-sectional view illustrating an arrangement of an optical disc in accordance with yet another Example of the present invention.

As one example, FIG. 15a illustrates a cross-sectional view of an optical disc 1e which has the same arrangement as that of the optical disc 1a of Example 1, except that the information layer 4 and an ultraviolet-curing resin film 36 are formed on a ROM substrate 5 on which read-only information pits (phase pits) are formed. As illustrated in FIG. 15a, the information layer 4, which is composed of the reflection layer 6, the light-absorbing film 3 and the temperature-responsive film 2, and the ultraviolet-curing resin film 36 are formed in this order on the recording surface 5a of the substrate 5. By thus forming the ultraviolet-curing resin film 36 on the surface of the information layer 4, it is possible to prevent the multilayer film (information film 4) from breaking by colliding with the optical head 12, etc. Moreover, the ultraviolet-curing resin film 36 excels in the light transmittance property. On this account, the optical beam 8 reaches the information layer 4 through the ultraviolet-curing resin film 36 and, thereby obtaining substantially the same effect as that of the optical disc 1a of Example 1.

Note that, the structure of films of the optical disc 1e illustrated in FIG. 15a is different from that of the optical disc 1a of Example 1. In the structure of FIG. 15a, and the thermal structure changes according to heat conduction of each film in the optical disc 1e. Because the operation of the temperature-responsive film 2 is sensitive to the temperature of the optical disc, it is necessary to select the thickness and the material of each film in consideration of ensuring the optimal effect.

Moreover, the optical films 1a to 1e are read-only discs in which the record marks are recorded in advance in the form of phase pits on the substrate 5. However, the present invention may be applied to a write-once type optical disc (optical information recording medium), a phase-change type optical disc or a magneto-optical type optical disc, having a recording layer for allowing recording of information on the substrate 5, with substantially the same effect as that of the optical discs 1a to 1e.

Figure 15B:
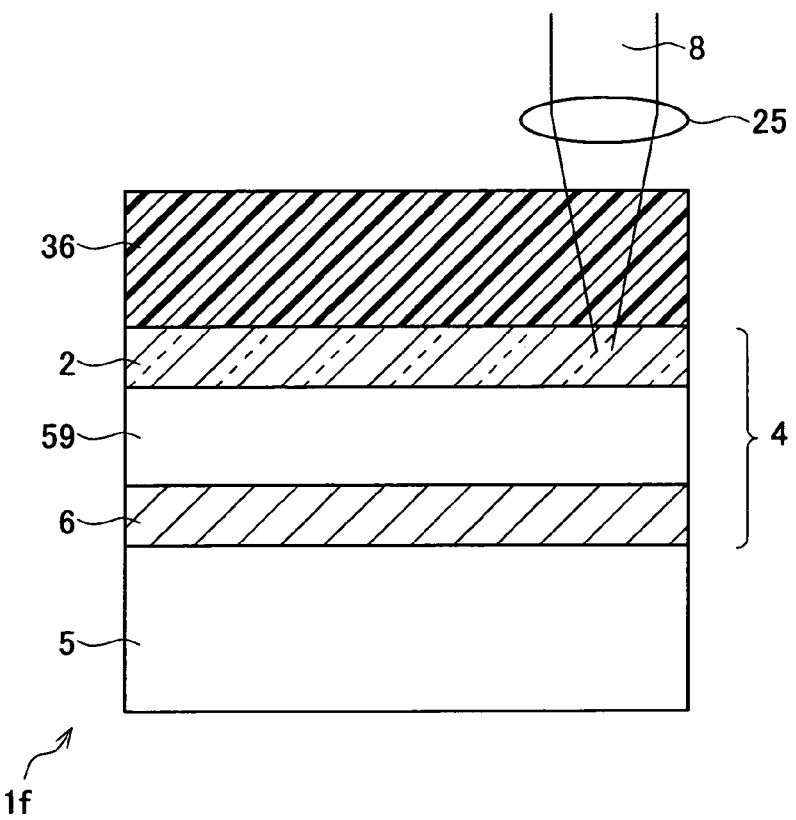

FIG. 15b illustrates an optical disc (optical information recording medium) 1f as an example of the arrangement including the recording layer for recording data. The cross-sectional view of FIG. 15b shows the optical disc 1f, which includes (i) the multilayer film (information layer) 4, which is composed of a recording/reproducing multilayer film (recording layer) 59 formed on the substrate 5 on which recording/reproducing grooves (not illustrated) are formed to allow recording of information, the reflection layer 6, the light-absorbing film 3 and the temperature-responsive film 2, and (ii) the ultraviolet-curing resin film 36, which are stacked in this order. Note that, a recording/reproducing multilayer film 59 may be a write-once recording film using an inorganic material or an organic material, a phase-change recording film or a magneto-optical recording film.

By adopting the optical disc 1*f* thus arranged to the arrangement in which the recording layer for recording information is included, it is possible to effectively reduce the effective spot diameter upon reproducing information, thereby further improving the recording density. Moreover, since the ultraviolet-curing resin film 36 is provided on the surface of the optical disc 1*f*, it is possible to prevent the multilayer film (information film 4) from breaking by colliding with the optical head 12, etc.

Note that, the structure of the films of the optical disc 1*f* illustrated in FIG. 15*b* is different from that of the optical disc 1*a* of Example 1. In the structure of FIG. 15*a*, the thermal structure changes according to heat conduction of each film in the optical disc 1*f*. On this account, it is necessary to select the thickness and the material of each film in consideration of ensuring the optimal effect. Aside from the arrangement illustrated in FIG. 15*b*, to realize, for example, a multilayer film (information layer 4), whose reflectivity is increased by incident light of high intensity, which film is realized by forming the temperature-responsive layer 2 in an optical disc having a write-once recording layer or a rewritable recording layer, it is necessary to design the optical disc in consideration of the change in reflectivity in the multilayer-film structure including the recording layer and a film for controlling the thermal property.

Incidentally, in the arrangement in which the reflectivity increases as the intensity of the incident light increases, the recording is performed with an optical pulse, whose intensity is 3 times to 10 times higher than the optical pulse for reproduction. Accordingly, the light absorption decreases with an increase in reflectivity of the optical disc, so that the recording marks may not be formed properly.

However, it has been confirmed that, when the intensity of incident light is not less than 6.0 mW, a change in intensity of the reflected light with respect to the intensity of incident light draws a straight line of a proportionality relation, meaning that the change in complex refractive index of the temperature-responsive film 2 does not endlessly change with an increase in power, and the change in complex refractive index is saturated with respect to the light having intensity of 6.0 mW or greater. That is, in the relation between the reproducing power (intensity of the incident light) and the reflectivity illustrated in FIG. 6, the increase in reflectivity stops at 6.0 mW, and does no longer increase even when the intensity of incident light is further increased. Regardless of the arrangement of the multilayer film (information layer 4) of the optical disc, the change in reflectivity is saturated in most of the optical discs using the inorganic super-resolution film with respect to incident light with a intensity=around 6.0 mW to 8.0 mW.

Therefore, while carrying out recording in the conventional way, it is possible to obtain the super-resolution effect upon reproduction, thereby carrying out super-resolution reproduction.

As with the arrangement of optical discs 1*a* to 1*d* of Examples 1 to 4, when the temperature-responsive film 2 is provided on the surface of the information layer 4, one of the planes of the temperature-responsive film 2 is in contact with the light-absorbing film 3, while the other is exposed to the air, it is possible to suppress heat from the temperature-responsive film 2, compared with the case where the temperature-responsive film 2 is in contact with the substrate 5, the other films (reflectivity film 6 and transparent film 35) made of inorganic materials, or the ultraviolet-curing resin film 36. Therefore, the temperature can be increased with a low reproducing power, ensuring a desirable sensitivity for the reproducing power. Moreover, even in the case where the temperature-responsive film 2 is replaced with a complex refractive index-changeable film (responsive film, for example, a wavelength-responsive film, etc), provided closest to the light receiving side, having a complex refractive index which changes directly by light, it is possible to fully use the incident light. Therefore, this is more effective to change the complex refractive index of the responsive film.

EXAMPLE 6

According to the optical discs 1*a* to 1*f* of Examples 1 to 5, the information layer 4 is provided on the surface of the substrate 5 so that the light is incident on the information layer 4. However, their relative positions are reversible, that is, the disc may be arranged so that the incident light reaches the information layer 4 through the substrate 5.

Figure 16A:
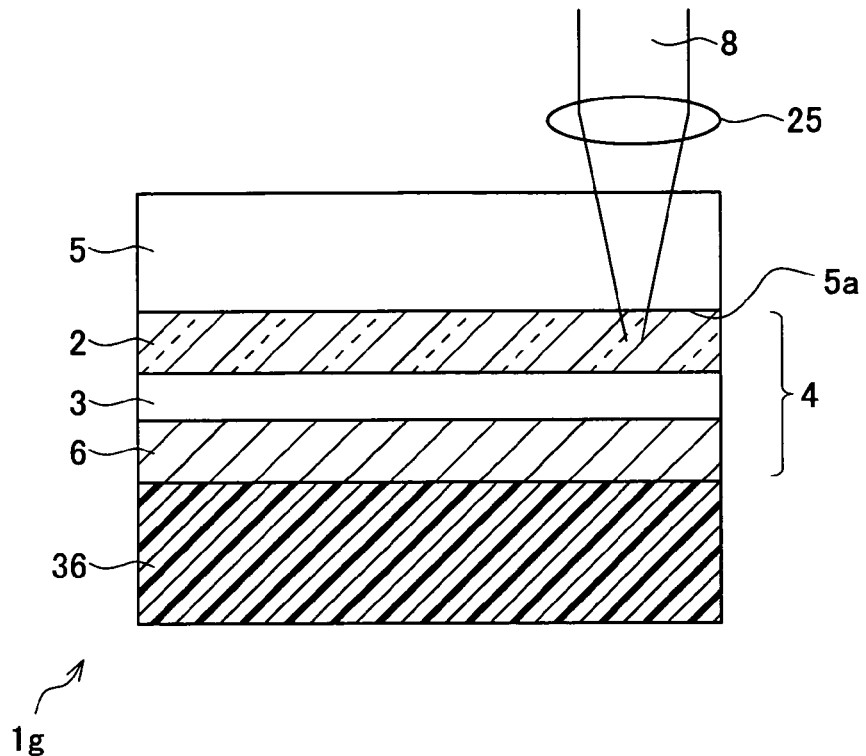
FIG. 16a is a cross-sectional view illustrating an arrangement of an optical disc in accordance with still another Example of the present invention.

FIG. 16*a* illustrates a cross-sectional view of an optical disc (optical information recording medium) 1*g* which is arranged such that the optical beam 8 reaches the multilayer film (information layer) 4 through the substrate 5. The optical disc 1*g* is arranged such that the films are formed in the opposite order to the order of the optical information recording medium 1*a* of Example 1, that is, the optical disc 1*g* is arranged such that the temperature-responsive film 2, the light-absorbing film 3 and the reflection film 6 are formed in this order on the recording surface 5*a* of the substrate 5. Note that, in FIG. 16*a*, as with the protective film for protecting the information layer 4, the ultraviolet-curing resin film 36 is formed on a surface (surface opposite to the surface on which the substrate 5 is provided) of the information layer 4.

Figure 16B:
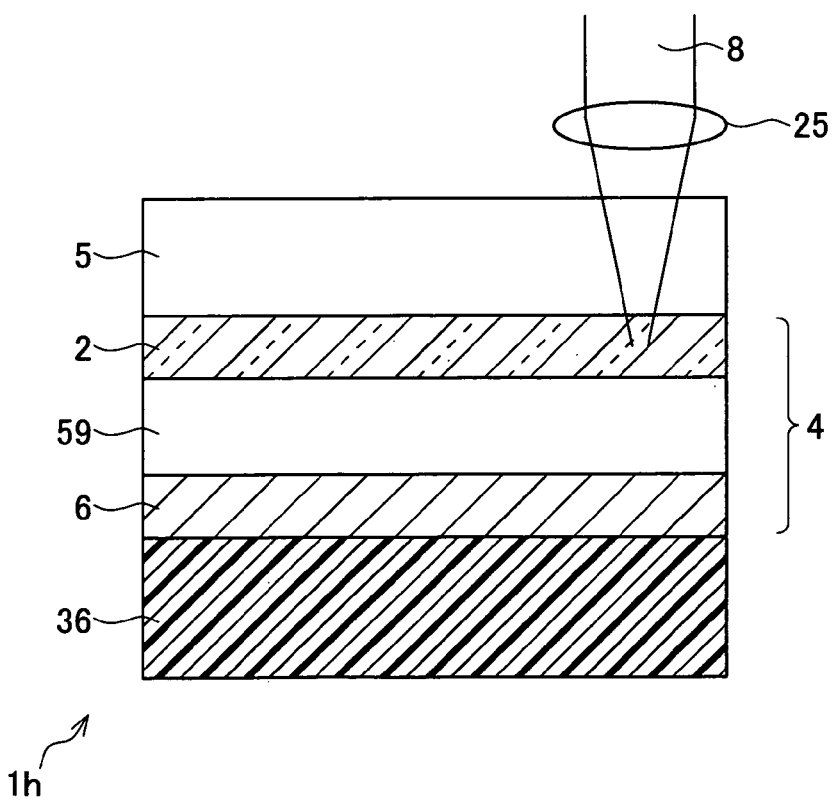

Moreover, FIG. 16*b* illustrates an optical disc 1*h* which is arranged such that the multilayer film (information layer) 4, which is composed of the temperature-responsive film 2, the light-absorbing film 3, the reflection film 6 and the recording/reproducing multilayer film (recording layer) 59 for recording information, and the ultraviolet-curing resin film 36 are formed in this order on the substrate 5 having the recording/reproducing grooves (not illustrated). Note that, in this arrangement, as with the optical disc 1*g* illustrated in FIG. 15*a*, the optical beam 8 is incident on the substrate 5. Note that, the recording/reproducing multilayer film 59 may be a write-once recording film using an inorganic material or an organic material, a phase-change recording film or a magneto-optical recording film.

Note that, according to the arrangement of the optical discs 1*g* and 1*h*, readout of information is performed via the substrate 5. Therefore, even when a reproduction plane (surface of the substrate) of the optical disc 1*g*/1*h* is damaged, a reading error hardly occurs.

Note that, the structure of the films of each of the optical discs 1*g* and 1*h* illustrated in FIGS. 16(*a*) and 16(*b*) is different from that of the optical disc 1*a* of Example 1, and the thermal structure changes according to heat conduction of each film in each of the optical disc 1*g* and 1*h*. Because the operation of the temperature-responsive film 2 is sensitive to the temperature of the optical disc, it is necessary to optimize the thickness and the material of each film.

EXAMPLE 7

In the optical discs 1a to 1h of Examples 1 to 6, only one information layer 4 is formed. However, the optical disc (optical information recording medium) of the present invention is not limited to this structure, but may have a multi-recording-section structure in which a plurality of recording surfaces or recording layers are formed to increase a recording capacity.

When a single disk having the multi-recording section structure in which a plurality of recording surfaces or recording layers are formed is combined with the arrangement in which the reflectivity increases with an increase in intensity of the incident light, which arrangement is described in the optical discs 1a to 1h of Examples 1 to 6, the recording density is increased by the super-resolution effect. Moreover, the reflectivity becomes high only when the incident light is brought to focus on the recording layer, thereby obtaining various great effects, such as stable autofocusing or stable tracking.

Figure 17A:
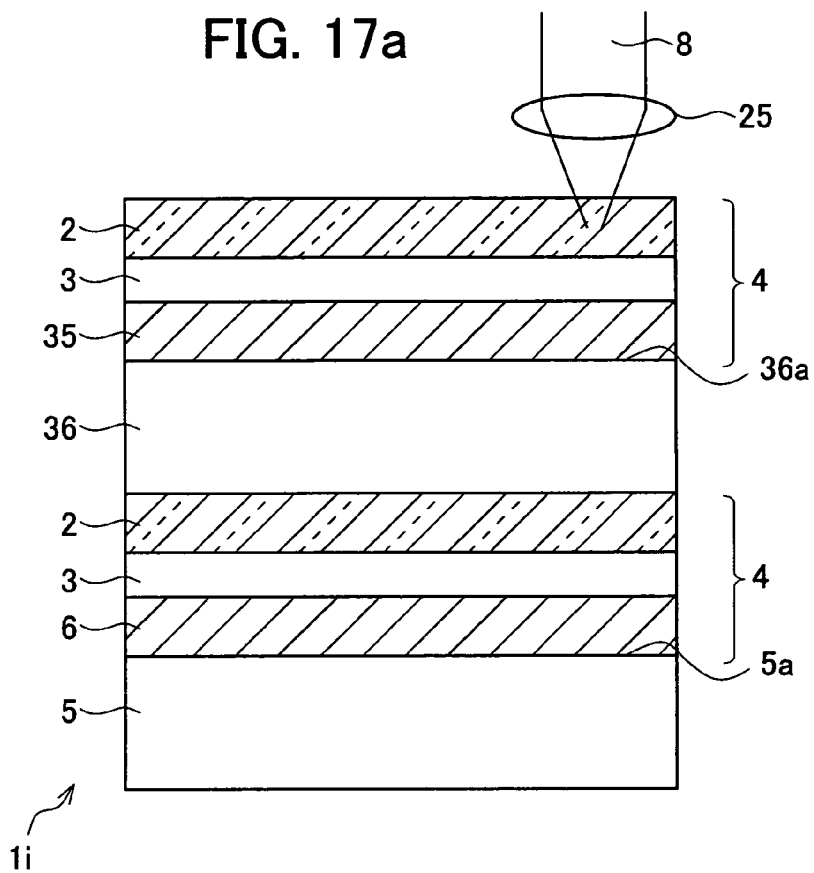
FIG. 17a is a cross-sectional view illustrating an arrangement of an optical disc in accordance with yet another example of the present invention.

FIG. 17a illustrates a cross-sectional view of an optical disc (optical information recording medium) 1i having the multi-recording-section structure in which two recording surfaces (recording sections) are provided. The optical disc 1i is realized by applying the present invention to a disc in which information is recorded in advance in the form of phase pits, which arrangement is already proposed in a Blu-ray Disc, etc.

As illustrated in FIG. 17a, the optical disc 1i is arranged such that the reflection film 6, the light-absorbing film 3, the temperature-responsive film 2, the ultraviolet-curing resin film 36, the transparent film 35, the light-absorbing film 3 and the temperature-responsive film 2 are formed on the recording surface 5a of the substrate 5. Note that, in this structure, the recording surface 36a, on which information is recorded in advance by the phase pits, is a surface, closer to the light receiving side, of the ultraviolet-curing resin film 36, that is, a surface in contact with the transparent film 35.

That is, the optical disc 1i is formed by stacking two recording sections: a first recording section and a second recording section. The first recoding section includes (a) the ultraviolet-curing resin film 36 and (b) a first information layer (first layer) 4 formed on the recording surface 36a of the ultraviolet-curing resin film 36. The first information layer 4 is composed of the transparent film 35, the light-absorbing film 3 and the temperature-responsive film 2. The second recording section includes the substrate 5, and a second information layer (second layer) 4 which is formed on the recording surface 5a of the substrate 5. The second information layer 4 is composed of the reflection film 6, the light-absorbing film 3 and the temperature-responsive film 2.

The first information layer 4 is composed of the transparent film 35 made of the SiN film of thickness about 20 nm, the light-absorbing film 3 made of the Si film of thickness about 30 nm and the temperature-responsive film 2 made of the ZnO film of thickness about 120 nm, which are stacked on one another on the recording surface 36a of the ultraviolet-curing resin film 36 of thickness 20 μm.

Meanwhile, the second information layer 4, which is formed between the ultraviolet-curing resin film 36 and the substrate 5, is composed of the reflection film 6 made of the Al film of thickness about 100 nm, the light-absorbing film 3 made of the Si film of thickness about 30 nm and the temperature-responsive film 2 made of the ZnO film of thickness about 120 nm, which are stacked on one another on the recording surface 5a of the substrate 5. Note that, the ultraviolet-curing resin film 36 is formed on the temperature-responsive film 2 of the second information layer 4. On the ultraviolet-curing resin film 36, the first information layer 4 is formed.

The following explains a method of producing the optical disc 1i. First, information is recorded on the substrate 5 in the form of phase pits for making depressions and projections on the surface. On the recording surface 5a of the substrate 5, the reflection film 6, the light-absorbing film 3 and the temperature-responsive film 2 each of which has the above-described thickness are formed by magnetron sputtering, followed by application of the ultraviolet-curing resin film 36. Next, like the recoding surface 5a of the substrate 5, information is recorded on the ultraviolet-curing resin film 36 in the form of phase pits for making depressions and projections on the surface by an ultraviolet-permeable transfer stamper. Further, with the transfer stamper attached thereto, the ultraviolet-curing resin film 36 is irradiated by ultraviolet light via the stamper for curing, the transfer stamper is then removed. In this way, the recording surface 36a of the ultraviolet-curing resin film 36 is formed. After that, on the recording surface 36a of the ultraviolet-curing resin film 36, the transparent film 35, the light-absorbing film 3 and the temperature-responsive film 2 each of which has the above-described thickness are formed by magnetron sputtering. Note that, the first information layer 4 is arranged in the same way as the information layer 4 of the optical disc 1c of Example 3, and the second information layer 4 is arranged in the same way as the information layer 4 of the optical disc 1a of Example 1. On this account, the first information layer 4 and the second information layer 4 provide substantially the same effects as the optical disc 1c and the optical disc 1a, respectively. However, considering the difference in temperature structure, a change in thickness of film is allowable.

When the information is reproduced in the optical disc thus arranged, reproduction light is incident on the temperature-responsive film 2 of the first information layer 4.

Here, since it is not desirable that the whole light is reflected by the first information layer 4, which is closer to the light receiving side, it is preferable to use, as the transparent film 35 of the first information layer 4, a light-permeable film which has better light transmittance property than the reflection film 6 of the second information layer 4. Moreover, the transparent film 35 (i) protects and insulates the light-absorbing film 3, and (ii) allows the light pass through to the second information layer 4 at the same time. That is, the transparent film 35 has advantages in realizing multi-layering, because the transparent film 35 protects the light-absorbing film 3 and improves the sensitivity of reproducing power of the first information layer 4.

Note that, in a conventional optical information recording medium having two recording sections, the reflectivity of the first multilayer film (information layer) is low, making autofocusing and tracking unstable. The conventional optical information recording medium is thus susceptible to disturbances in reproduction. In contrast, in the optical disc 1i of the present example, the reflectivity of each of the first information layer 4 and the second information layer 4 increases with an increase in intensity of the incident light. This increase in reflectivity occurs only when the temperature-responsive film 2 exists within the focal depth of reproduction light.

When reproducing information on the recording surface 36a through the first information layer 4, the light is brought to a focus on a first recording section including the first information layer 4, and the reflectivity of the first information layer 4 is increased. However, here, the focal point of the light is distant from the super-resolution layer of the second information layer 4, and therefore the reflectivity of the second information layer 4 does not increase. Therefore, no adversely effect occurs in reproduction of the first recording section. Meanwhile, when reproducing information in a second recording section including the second information layer 4, the light is brought to a focus on the second recording section, and the reflectivity of the second information layer 4 is increased. However, here, the focal point of the optical beam is distant from the super-resolution layer of the first information layer 4, and therefore the reflectivity of the first information layer 4 does not increase. Therefore, no adversely effect occurs in reproduction of the second recording section. On this account, autofocusing and tracking are stable in the optical disc 1i.

Moreover, it is possible to shorten an interval between the first recording section and the second recording section adjacent to each other, as compared with a normal recording medium having the multi-recording-section structure. In the normal recording medium having the multi-recording-section structure, the interval between the first recording section and the second recording section usually ranges from 20 µm to 50 µm. In contrast, in the present invention, the interval is reduced to a range from 2 µm to 20 µm. Note that, the interval between the first recording section and the second recording section adjacent to each other can be shortened by adjusting the thickness of the ultraviolet-curing resin film 36 formed between those recording sections.

Moreover, both of the first recording section (closer to the light receiving side) and the second recording section (less closer to the light receiving side; a recoding section subsequent to the first recording section, viewed from the light receiving side) may be combined with a film whose complex refractive index to cause an increase in reflectivity However, because there is no recording section exists on the second recording section, it is also allowable to originally set a high reflectivity, instead of making such a combining with the temperature-sensitive film 2. Alternately, it may be arranged such that only the first recording section, closer to the light receiving side, is combined with a film made of a material similar to the material of the temperature-responsive film 2 described in Examples 1 to 4, so that the original reflectivity, which is set low, increases only when the spot is brought to a focus on the first recording section. Applying the temperature-responsive film 2 to the first recording section eases the difficulties in designing the reflectivity, thus increasing a possibility of an optical disc having the multi-recording-section structure having two recording sections.

Moreover, by setting the thickness of each film in view of making such an effect that the reflectivity becomes high upon reproduction and the absorptance becomes low relatively, but the reflectivity becomes low when a very strong laser power recording irradiates the optical disc upon recording: it is possible to prevent deterioration of data by the light for reading-out without lowering the sensitivity for recording, regardless of the number of recording sections.

Moreover, apart from the ZnO film described above, the temperature-responsive film, which is the inorganic super-resolution film, may be made of any one of an oxide, a nitride, a sulfide, a fluoride and a carbide, each of which is a combination of elements having a plurality of compounds.

Moreover, among those optical discs of Examples described above, the optical disc, having the arrangement in which the light is incident on the multilayer film (information layer), can be combined with another optical disc having the same arrangement, by adhering their substrates with an adhesive. This arrangement allows recording of information on both surfaces of the optical disc, while maintaining the strength of disc.

Figure 17B:
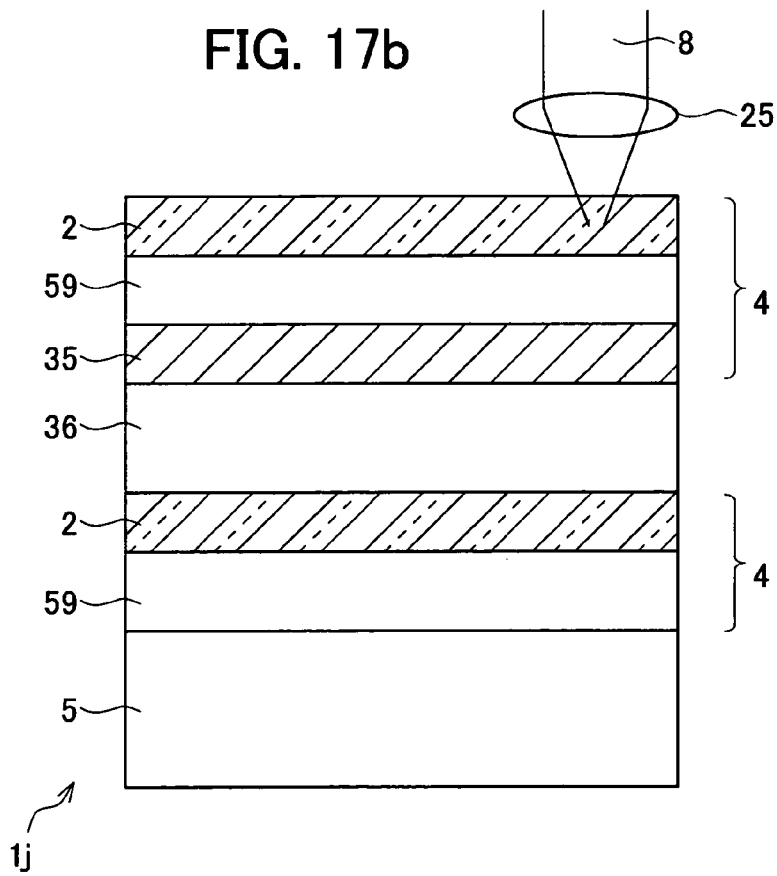

Moreover, the optical disc may have the multi-recording-section structure using a plurality of recording layers (recording sections). FIG. 17b illustrates a cross-sectional view of an optical disc 1j which is one example of the optical disc having the multi-recording-section structure using two recording layers. Note that, the optical disc 1j is capable of both recording and reproducing.

As illustrated in FIG. 17b, the optical disc 1j is arranged such that, on the substrate 5, the recording/reproducing multilayer film (recording layer) 59, the light-absorbing film 3, the temperature-responsive film 2, the ultraviolet-curing resin film 36, the recording/reproducing multilayer film 59, the transparent film 35, the light-absorbing film 3 and the temperature-responsive film 2 are formed.

That is, the optical disc 1j is formed by stacking two recording sections: a first recording section and a second recording section. The first recording section includes (a) the ultraviolet-curing resin film 36 and (b) a first information layer 4 formed on the ultraviolet-curing resin film 36. The first information layer 4 is composed of the recording/reproducing multilayer film 59, the transparent film 35, the light-absorbing film 3 and the temperature-responsive film 2. The second recording section includes the substrate 5 and a second information layer 4 which is formed on the substrate 5. The second information layer 4 is composed of the recording/reproducing multilayer film 59, the reflection film 6, the light-absorbing film 3 and the temperature-responsive film 2.

The first recording section is composed of the recording/reproducing multilayer film 59, the transparent film 35 made of the SiN film of thickness about 20 nm, the light-absorbing film 3 made of the Si film of thickness about 30 nm and the temperature-responsive film 2 made of the ZnO film of thickness about 120 nm, which are stacked on the ultraviolet-curing resin film 36 with a thickness=20 µm. Note that, the recording/reproducing multilayer film 59 in the first recording section is a phase-change type recording/reproducing multilayer film 59 composed of a $TiO_2$ film of thickness 19 nm, an Ag alloy reflection film of thickness 10 nm, a $ZnS.SiO_2$ film of thickness 30 nm, a GeSnSbTe film of thickness 6 nm and a $ZnS.SiO_2$ film of thickness 30 nm, which are stacked in this order from a side of the ultraviolet-curing resin film 36.

Meanwhile, the second information section, which is formed between the ultraviolet-curing resin film 36 and the substrate 5, is composed of the recording/reproducing multilayer film 59, the light-absorbing film 3 made of the Si film of thickness about 30 nm and the temperature-responsive film 2 made of the ZnO film of thickness about 120 nm, which are stacked on one another on the substrate 5. Note that, the ultraviolet-curing resin film 36 is formed on the temperature-responsive film 2 of the second information layer 4. On the ultraviolet-curing resin film 36, the first recording section is formed. Here, the recording/reproducing multilayer film 59 of the second recording section is a phase-change type recording/reproducing multilayer film 59 composed of the Ag alloy reflection film of thickness 80 nm, the $ZnS.SiO_2$ film of thickness 30 nm, a GeSbTe film of thickness 10 nm and $ZnS.SiO_2$ film of thickness 30 nm, which are stacked in this order form the side of the substrate 5.

Thus, the optical disc 1j having the multi-recording-section structure with a plurality of recording layers can obtain substantially the same effect as the optical disc 1i illustrated in FIG. 17a.

Note that, each of the recording/reproducing multilayer films 59 of the first recording section and the second recording section is not limited to the above-described arrangement. For example, the recording/reproducing multilayer film may be a write-once recording film using an inorganic film or an organic film, a phase-change type rewritable recording film or a magneto-optical type rewritable recording film.

Moreover, in the case of the optical disc having the multi-recording-section structure, when the recording section (either (i) muiltilayer film (information layer) including the recording layer, or of (ii) a recording surface and a multilayer film (information layer) in contact with the recording surface), which is closer to the light receiving side, has a high reflectivity, the light does not reach the subsequent recording section, thereby failing recording/reproducing information. Therefore, the structure needs to be arranged so that the recording section closer to the light receiving side has a low reflectivity, allowing to the recording sections to securely carry out recording/reproducing of information. However, a low reflectivity may make autofocusing and tracking unstable. Therefore, it is necessary to set the reflectivity by considering these two aspects.

Moreover, the effect (the results illustrated in FIG. 6) of changing the reflectivity in response to an increase in intensity of the incident light described in each example above is not obtained when the focal point is shifted by 2 μm (twice the depth of focus) from the exact focal point. That is, the effect is obtained only when the power density of light is sufficiently high.

Generally, the recording sections of the recording medium having the multi-recording-section structure is provided with intervals ranging from 20 μm to 50 μm. When applying the arrangement of the information layer 4, in which the reflectivity is increased by the change in complex refractive index of the temperature-responsive film 2, explained in Examples 1 to 6, to each of the recoding sections of the optical disc having the multi-recording-section structure; the change in reflectivity, with the change in complex refractive index does not occur in the temperature-responsive film 2 provided in the multilayer film of the adjacent recording sections. This is because, when the light is focused on a certain recording section, the interval between the recording section and an adjacent recoding section is sufficiently longer than the depth of focus.

On this account, the reflectivity is kept low when the light is out-of-focus, but becomes sufficient when the light is focused. Therefore, it is possible to securely carrying out stable autofocusing and tracking. Moreover, according to this theory, the interval between the recording sections of the recording medium having the multi-recording-section structure can be shortened to a range from 2 μm to 20 μm.

It however should be noted that, in the recording medium having the multi-recording-section structure, when the number of recording sections is increased, the spot deteriorates due to spherical aberration. The medium with two recording sections is most realistic.

Note that, as long as the disc has the recording layer in the multilayer film (information layer), the present invention is applicable to various types of optical disks, for example, a write-once type optical disc on which information is recordable, a phase-change optical disc and a magneto-optical disc, specifically, MD, MO, DVD-RAM, DVD-RW, DVD-R, CD-RW, CD-R, BD-RW, BD-R, etc. Moreover, the present invention is also applicable to a read-only disc when the disc has the recording surface on which information is recorded in advance, the examples include CD, CD-ROM, DVD, DVD-ROM, and BD-ROM.

Moreover, the information layer 4 includes a responsive film whose complex refractive index changes according to a change in temperature. With this arrangement, it is possible to change the multiple interference of light in the information layer in response to the change in temperature, which depends on the intensity of optical beam, of the information layer in the light spot. Such a responsive film whose complex refractive index changes according to the temperature allows relatively easy selection for the material. Moreover, the control of reflectivity can be made by modifying the multiple interference of light in a thin-film section (information layer), which is caused by temperature, it is easy to design the information layer.

As described above, in the optical information recording medium of the present invention, the information layer includes a responsive film whose complex refractive index changes according to the optical beam wherein an extinction coefficient of the complex refractive index is less than 0.2 at room temperature.

According to the optical beam, the distribution of the condition of multiple interference of light is changed in the information layer in the light spot. Then, the reflectivity in the light spot changes in response to the temperature distribution. As a result, it is possible to intensively read recording bits in a region, smaller than the light spot, in the light spot. In this manner, it becomes possible to successfully reduce the effective reproducing spot, thereby carrying out a super-resolution reproduction.

Moreover, the extinction coefficient of the complex refractive index of the responsive film is less than 0.2 at room temperature, that is, the responsive film is highly transparent. On this account, the light absorption, which occurs while the light of the optical beam repeatedly reflects in the responsive film, is suppressed, so that the light is reflects in the responsive film many times. In this way, the amount of light repeatedly reflected in the responsive film is increased, so that the effect of the multiple interference of light can be enhanced. As a result, the change, by the optical beam, in the reflectivity of the information layer can be increased, and it is possible to reduce the effective reproducing spot more effectively.

Moreover, in the optical information recording medium of the present invention, the information layer includes (i) a light-absorbing film which absorbs a part of the optical beam so that a temperature of the information layer increases, and (ii) a responsive film whose complex refractive index changes according to a change in temperature.

Therefore, according to the intensity distribution, in the light spot, of the optical beam, the temperature distribution is generated in the responsive film, and the complex refractive index of the responsive film is changed. Then, the reflectivity in the light spot changes in response to the temperature distribution generated according to the intensity of the optical beam. As a result, it is possible to intensively read recording bits in a region, smaller than the light spot, in the light spot. In this manner, it becomes possible to successfully reduce the effective reproducing spot, thereby carrying out a super-resolution reproduction.

Moreover, in the optical information recording medium of the present invention, the information layer may include (i) a recording layer for recording information with irradiation of an optical beam and reproducing the information with irradiation of an optical beam, the recording layer absorbing a part of the optical beam so that a temperature of the recording layer increases; and (ii) a responsive film whose complex refractive index changes according to a change in temperature.

Therefore, it is possible to realize the optical information recording medium capable of recording and reproducing information. Moreover, according to the above arrangement, when the optical beam is incident on the optical information recording medium, the recording layer absorbs a part of the optical beam so as to increase the temperature of the information layer. In this way, the complex refractive index of the responsive film is changed, and it is possible to change the reflectivity in the light spot according to the temperature distribution generated according to the intensity of the optical beam. As a result, it is possible to intensively read recording bits in a region, smaller than the light spot, in the light spot. In this manner, it becomes possible to successfully reduce the effective reproducing spot, thereby carrying out a super-resolution reproduction.

Moreover, the recording/reproducing method of the present invention includes the step of irradiating any one of the above optical information recording medium with an optical beam so as to change reflectivity of the information layer by changing the complex refractive index of the information layer, so as to enable recording or reproducing of information whose mark length is shorter than a diffraction limit of the optical beam.

Therefore, it is possible to record or reproduce information whose mark length is shorter than the spot diameter of the optical beam, without drastically changing the arrangement of the conventional device.

Moreover, the recording/reproducing device of the present invention changes reflectivity of the information layer by changing the complex refractive index of the information layer, so as to enable recording or reproducing of information whose mark length is shorter than a diffraction limit of the optical beam.

Therefore, it is possible to record or reproduce information whose mark length is shorter than the spot diameter of the optical beam, without drastically changing the arrangement of the conventional device.

Moreover, it is preferable that the extinction coefficient of the complex refractive index of the responsive film be less than 0.2 at room temperature. In this case, the light absorption, which occurs while the light of the optical beam repeatedly reflects in the responsive film, is suppressed, so that the light reflects in the responsive film many times. In this way, the amount of light repeatedly reflected in the responsive film is increased, so that the effect of the multiple interference of light can be enhanced. As a result, the change, by the optical beam, in the reflectivity of the information layer can be increased, and it is possible to reduce the effective reproducing spot more effectively.

Moreover, the information layer may include a recording layer for recording information with irradiation of an optical beam, and for reproducing the information with irradiation of an optical beam. According to the above arrangement, it is possible to realize the optical information recording medium capable of recording and reproducing information. Note that, as such a recording layer, for example, it is possible to use a write-once recording film, a magneto-optical recording film, a phase-change recording film, etc.

Moreover, the light-absorbing film may be provided in contact with the responsive film so that the responsive film and the light-absorbing film are adjacently provided in this order from a receiving side of the optical beam. According to the above arrangement, it is possible to effectively change the temperature of the responsive film.

Moreover, the information layer may include a reflection film which reflects the optical beam having passed through the responsive film and the light-absorbing film. In this case, because the reflection film is provided, it is possible to increase the reflectivity by reflecting the optical beam having passed through the responsive film. In this way, it is possible to improve the efficiency for light utilization.

Moreover, the information layer may include a heat-insulating film, provided on a surface of the light-absorbing film in an opposite direction to the responsive film, for suppressing diffusing heat from the light-absorbing film into the opposite direction to the temperature-responsive film. According to the above arrangement, the heat-insulating film can prevent heat from diffusing from the light-absorbing film to the side opposite to another side of the temperature-responsive film. In this way, it is possible to effectively change the temperature of the responsive film.

Moreover, the information layer may include a heat-insulating film, provided between the light-absorbing film and the reflection film, for suppressing diffusing heat from the light-absorbing film to the reflection film. In this case, the heat-insulating film can prevent heat from diffusing from the light-absorbing film to the reflection film. In this way, it is possible to effectively change the temperature of the responsive film.

Moreover, it is preferable that the heat-insulating film be transparent, or have a light transmittance property. According to the above arrangement, it is possible to prevent the light of the optical beam from being absorbed by the heat-insulating film. On this account, the change, according to the optical beam, in the reflectivity of the information layer can be increased, and it is possible to reduce the effective reproducing spot more effectively.

Moreover, the information layer may include a protective film, provided on a surface of the light-absorbing film in an opposite direction to a light receiving side of the optical beam, for suppressing deterioration of the light-absorbing film. Because the temperature of the light-absorbing film increases by light absorbing of the light-absorbing film, the increase in temperature easily occurs. Therefore, the light-absorbing film may break, deteriorate, oxidize, etc. However, according to the above arrangement, the protective film is provided, so that the effect of preventing the light-absorbing film from oxidizing and deforming can be obtained.

Moreover, the responsive film may be made of an oxide thin film containing Zn. Moreover, the responsive film may be made of a sulfide thin film containing Zn. Moreover, the responsive film may be made of a carbide thin film containing Si. Moreover, the responsive film may be made of an oxide thin film containing Ce. Moreover, the responsive film may be made of an oxide thin film containing Sn.

By using the responsive film made of any one of the above thin films, it is possible to obtain a highly-transparent responsive film which makes it possible to adequately obtain the effect of the multiple interference of light.

Moreover, the optical information recording medium may include a substrate for strengthening the optical information recording medium, wherein the information layer is provided closer to a light receiving side than the substrate. According to the above arrangement, the information layer is provided closer to the light receiving side than the substrate. On this account, it is possible to reduce aberration, etc. caused by inclination and birefringence of the substrate, etc., and therefore, this structure achieves higher density than the arrangement in which the optical beam irradiates the information layer via the substrate.

Moreover, in this case, the responsive film may be provided on a portion closest to the light receiving side, in the optical information recording medium. According to the above arrangement, the responsive film is provided on a portion closest to the light receiving side, in the optical information recording medium. On this account, the responsive film is exposed to the air, and the air acts as a heat-insulator. Therefore, the heat is not easily released from the responsive film. As a result, it is possible to effectively change the temperature of the responsive film.

Moreover, a protective film for protecting the information layer may be formed on a surface, which is irradiated by light, of the information layer. According to the above arrangement, it is possible to protect the information layer by the protective film.

Moreover, the optical information recording medium may include a substrate for strengthening the optical information recording medium, wherein the substrate is provided closer to a light receiving side than the information layer. According to the above arrangement, the substrate is provided closer to the information layer. Therefore, it is possible to protect the information layer. Moreover, a reading error hardly occurs even when the substrate is damaged.

Moreover, two or more information layers may be included. In this case, two or more information layers are provided, so that it becomes possible to stack a plurality of recording layers or recording surfaces. Therefore, even when the size of the optical information recording medium having a plurality of information layers is the same as that of the optical information recording medium having one information layer, it is possible to increase the recording capacity.

Moreover, in this case, the plurality of the information layers are provided with intervals ranging from 2 μm to 20 μm. According to the above arrangement, the interval between the information layers adjacent to each other is from 2 μm to 20 μm. Therefore, it becomes easy to provide a plurality of information layers. Moreover, the accuracy and manufacturing efficiency are improved.

Moreover, the information layer has a reflectivity which changes when an intensity of the optical beam becomes equal to or more than a predetermined value wherein a rate of difference of the reflectivity between an intensity of the optical beam equal to or more than a predetermined value, and an intensity of the optical beam less than the predetermined value ranges from −15% to 350%.

In this case, the reflectivity, using the multiple interference of light, of the information layer changes when the intensity of the optical beam is equal to or more than the predetermined value. Therefore, it is possible to narrow the intermediate transition region which is a boundary between the masked region and the reproduction region in the light spot, as compared with the case where the reflectivity gradually changes according to the intensity of incident light. On this account, it is possible to intensively read out the recording bits in the reproduction region. As a result, noises are reduced and the quality of signals is improved.

Moreover, the information layer may have a reflectivity which depends on a wavelength, and the reflectivity has substantially the local minimal value with respect to a wavelength of the optical beam, under condition that the complex refractive index of the responsive film does not change.

According to the above arrangement, when a wavelength distribution of the reflectivity is examined in a state in which the complex refractive index of the responsive film does not change (i.e., in a state where an optical information recording medium is not irradiated with a focused light for enabling reproduction of signals from the optical information recording medium), the reflectivity becomes substantially the local minimal value at about the wavelength. On this account, the information layer has a reflection preventing structure using the multiple interference of light. Therefore, the reflection preventing structure is collapsed in a region, smaller than the light spot by light irradiation, thereby obtaining high reflectivity. In this way, it becomes possible to intensively read out the recording bits in the region, and the effective reproducing spot is reduced, thereby carrying out the super-resolution reproduction.

Moreover, the recording layer may absorb a part of the optical beam so that a temperature of the recording layer increases. According to the above arrangement, when the optical beam is incident on the optical information recording medium, the recording layer absorbs a part of the optical beam so as to increase the temperature of the information layer. In this way, the complex refractive index of the responsive film is changed. Moreover, the reflectivity in the light spot can be changed according to the temperature distribution generated according to the intensity of the light spot of the optical beam. As a result, it is possible to intensively read recording bits in a region, smaller than the light spot, in the light spot. In this manner, it becomes possible to successfully reduce the effective reproducing spot, thereby carrying out a super-resolution reproduction.

Moreover, a protective film for protecting the recording layer may be provided. In this case, it is possible to protect the recording layer by the protective film.

Moreover, it is preferable that the protective film be transparent, or have a light transmittance property. According to the above arrangement, it is possible to prevent the light of the optical beam from being absorbed by the protective film. On this account, it is possible to increase the change, according to the optical beam, in the reflectivity of the information layer, and possible to reduce the effective reproducing spot more effectively.

Moreover, all the layers, except for the recording layer and the protective film, of the information layer may be made of an inorganic substance. In this case, the information layer hardly breaks by heat, and durability with respect to repetitive reproduction or recording can be improved.

Moreover, an object of the present invention can be expressed as follows: an object of the present invention is to provide (i) an optical information recording medium which enables effective reduction of the effective spot diameter and further improve the recording density, by increasing the change in complex refractive index of the information layer which includes the inorganic super-resolution film, in order to obtain the medium super-resolution effect with the inorganic super-resolution film endured repeated reproducing of information, (ii) a method of reproducing optical information (recording/reproducing method) with the optical information recording medium and (iii) an optical information processing device (recording/reproducing device).

Moreover the optical information recording medium of the present invention can be expressed as follows: the optical information recording medium of the present invention includes the information layer, composed of one or more thin films, on the substrate, the information layer comprising: (i) at least a temperature-responsive film, which excels in the light transmittance property and having a complex refractive index which changes according to the intensity of incident light, wherein the thin films of the information layer are made of an inorganic substance; otherwise, when one of the thin films of the information layer is a recording layer for recording information, the thin films other than the recording layer are all made of an inorganic substance; and the reflectivity of the information layer is changed according to the change in multiple interference of light in the information layer, which is caused by a change in complex refractive index of the temperature-responsive film.

Moreover, the optical information recording medium of the present invention can be expressed as follows: the optical information recording medium of the present invention includes: a substrate; and a multilayer film (information layer) including at least a light-absorbing film, wherein: (i) the information layer is composed of two or more thin films, (ii) each layer of the information layer is made of an inorganic substance, and (iii) the reflectivity of the information layer changes according to the change in multiple interference of light in the information layer.

Moreover, the optical information recording medium of the present invention can be expressed as follows: the optical information recording medium includes: a substrate; and a multilayer film (information layer) including at least the recording layer and the light-absorbing layer, wherein: (i) the information layer is composed of two or more thin films, (ii) each layer, except for the recording layer, of the information layer is made of an inorganic substance, and (iii) the reflectivity of the information layer changes according to the change in the multiple interference of light in the information layer.

Moreover, in addition to each of the optical information recording mediums described above, the optical information recording medium of the present invention can be expressed as follows: the change in reflectivity according to the change in multiple interference of light in the multilayer film (information layer) is made by a greater degree when the intensity of incident light is equal to or more than a predetermined value.

Moreover, the optical information recording medium of the present invention can be expressed as follows: the optical information recording medium of the present invention is arranged such that (i) at least one layer of the multilayer film(s) (information layer) is a light-transmitting film through which the incident light passes, and (ii) the information layer has an arrangement similar to either (i) a reflection prevention arrangement using the multiple interference of light or (ii) an arrangement, in the vicinity of the wavelength of incident light.

Moreover, the light-transmitting film may be the temperature-responsive film whose complex refractive index changes according to the change in temperature of the information layer, which depends on the intensity of the incident light.

Moreover, the recording/reproducing device of the present invention can be expressed as follows: the recording/reproducing device carries out recording/reproduction with the optical information recording medium of the present invention, thereby enabling recording/reproduction of a signal whose mark length is shorter than the resolution limit of the optical system of the recording/reproducing device.

Moreover, the reproducing device (recording/reproducing device) of the present invention can be expressed as follows: the reproducing device (recording/reproducing device) of the present invention carries out reproduction with the optical information recording medium of the present invention, thereby enabling reproduction of a signal whose mark length is shorter than the resolution limit of the optical system of the reproducing device.

The present invention is applicable to (i) the optical information recording medium, such as, for example, a write-once type optical disc on which information is recordable, a phase-change optical disc and a magneto-optical disc, specifically, MD, MO, DVD-RAM, DVD-RW, DVD-R, CD-RW, CD-R, BD-RW, BD-R, or a read-only disc, specifically, CD, CD-ROM, DVD, DVD-ROM, BD-ROM, etc., (ii) an optical information recording/reproducing method for recording/reproducing information on those discs and (iii) an optical information recording/reproducing device.

The present invention is not limited to the embodiments above, but may be altered within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An optical information recording medium including a substrate and a plurality of information layers for enabling reproduction of information recorded on a surface of the substrate or a recording layer for recording information, with irradiation of an optical beam, each information layer consisting essentially of: a heat insulating film,
a light-absorbing film, consisting of silicon or germanium, which absorbs a part of the optical beam so that a temperature of the information layer increases and which is in contact with the heat insulating film; and
a responsive film, made of an inorganic substance, whose complex refractive index changes according to a change in temperature which is in contact with the light absorbing film and wherein the information layers are separated by intervals of 2-20 μm.

2. The optical information recording medium as set forth in claim 1, wherein:
an extinction coefficient of the complex refractive index of the responsive film is less than 0.2 at room temperature.

3. The optical information recording medium as set forth in claim 1, wherein:
the information layer comprises a recording layer for recording information with irradiation of an optical beam, and for reproducing the information with irradiation of an optical beam.

4. The optical information recording medium as set forth in claim 3, wherein the recording layer absorbs a part of the optical beam so that a temperature of the recording layer increases.

5. The optical information recording medium as set forth in claim 4, further comprising:
a protective film for protecting the recording layer.

6. The optical information recording medium as set forth in claim 5, wherein:
the protective film is transparent, or has a light transmittance property.

7. The optical information recording medium as set forth in claim 1, wherein:
the light-absorbing film is provided in contact with the responsive film so that the responsive film and the light-absorbing film are adjacently provided in this order from a receiving side of the optical beam.

8. The optical information recording medium as set forth in claim 1, wherein:
the information layer comprises a reflection film which reflects the optical beam having passed through the responsive film and the light-absorbing film.

9. The optical information recording medium as set forth in claim 8, wherein:
the information layer comprises the heat-insulating film, provided between the light-absorbing film and the reflection film, for suppressing diffusing heat from the light-absorbing film to the reflection film.

10. The optical information recording medium as set forth in claim 9, wherein:
the heat-insulating film is transparent, or has a light transmittance property.

11. The optical information recording medium as set forth in claim 1, wherein:
the heat-insulating film is transparent, or has a light transmittance property.

12. The optical information recording medium as set forth in claim 1, wherein:
the information layer comprises a protective film, provided on a surface of the light-absorbing film in an opposite direction to a light receiving side of the optical beam, for suppressing deterioration of the light-absorbing film.

13. The optical information recording medium as set forth in claim 12, wherein:
the protective film is transparent, or has a light transmittance property.

14. The optical information recording medium as set forth in claim 1, further comprising:
a substrate for strengthening the optical information recording medium, wherein:
the information layer is provided closer to a light receiving side than the substrate.

15. The optical information recording medium as set forth in claim 14, wherein:
the responsive film is provided on a portion closest to the light receiving side, in the optical information recording medium.

16. The optical information recording medium as set forth in claim 1, wherein:
the information layer includes a protective film on a light receiving surface, for protecting the information layer.

17. The optical information recording medium as set forth in claim 16, wherein:
the protective film is transparent, or has a light transmittance property.

18. The optical information recording medium as set forth in claim 1, further comprising:
a substrate for strengthening the optical information recording medium, wherein:
the substrate is provided closer to a light receiving side than the information layer.

19. The optical information recording medium as set forth in claim 1, wherein:
the information layer has a reflectivity which changes when an intensity of the optical beam becomes equal to or more than a predetermined value wherein a rate of difference of the reflectivity between an intensity of the optical beam equal to or more than a predetermined value, and an intensity of the optical beam less than the predetermined value ranges from −15% to 350%.

20. The optical information recording medium as set forth in claim 1, wherein:
the information layer has a reflectivity which depends on a wavelength, and the reflectivity has substantially a local minimal value with respect to a wavelength of the optical beam, under condition that the complex refractive index of the responsive film does not change.

21. The optical information recording medium as set forth in claim 1, wherein:
the information layer has a reflectivity which is changed when an intensity of the optical beam becomes equal to or more than a predetermined value wherein a rate of difference of the reflectivity between an intensity of the optical beam equal to or more than a predetermined value, and an intensity of the optical beam less than the predetermined value is not less than 4%.

22. A recording/reproducing method for an optical information recording medium including a substrate and a plurality of information layers for enabling reproduction of information recorded on a surface of the substrate or a recording layer for recording information, with irradiation of an optical beam, each information layer consisting essentially of: a heat insulating film, a light-absorbing film, consisting of silicon or germanium, which absorbs a part of the optical beam so that a temperature of the information layer increases and which is in contact with the heat insulating film and a responsive film, made of an inorganic substance, whose complex refractive index changes according to a change in temperature which is in contact with the light absorbing film and wherein the information layers are separated by intervals of 2-20 μm, the method comprising the step of:
irradiating the optical information recording medium with an optical beam so as to change reflectivity of the information layer by changing the complex refractive index of the information layer, so as to enable recording or reproducing of information whose mark length is shorter than a diffraction limit of the optical beam.

23. A recording/reproducing device including an optical information recording medium, the optical information recording medium including a substrate and a plurality of information layers for enabling reproduction of information recorded on a surface of the substrate or a recording layer for recording information with irradiation of an optical beam, each information layer consisting essentially of: a heat insulating film, a light-absorbing film, consisting of silicon or germanium, which absorbs a part of the optical beam so that a temperature of the information layer increases and which is in contact with the heat insulating film; and a responsive film, made of an inorganic substance, whose complex refractive index changes according to a change in temperature which is in contact with the light absorbing film and wherein the information layers are separated by intervals of 2-20 μm,
the recording/reproducing device changing reflectivity of the information layer by changing the complex refractive index of the information layer, so as to enable recording or reproducing of information whose mark length is shorter than a diffraction limit of the optical beam.

* * * * *

UNITED STATES PATENT AND TRADEMARK OFFICE
CERTIFICATE OF CORRECTION

PATENT NO. : 7,651,832 B2 Page 1 of 1
APPLICATION NO. : 11/083463
DATED : January 26, 2010
INVENTOR(S) : Takamori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1350 days.

Signed and Sealed this

Twenty-third Day of November, 2010

David J. Kappos
*Director of the United States Patent and Trademark Office*